(12) United States Patent
Isobe et al.

(10) Patent No.: US 7,906,943 B2
(45) Date of Patent: Mar. 15, 2011

(54) BOOST CONVERTER WITH ADAPTIVE COIL PEAK CURRENT

(75) Inventors: Yuji Isobe, Irvine, CA (US); Chii-Fa Chiou, Lake Forest, CA (US)

(73) Assignee: Microsemi Corporation, Irvine, CA (US)

( * ) Notice: Subject to any disclaimer, the term of this patent is extended or adjusted under 35 U.S.C. 154(b) by 494 days.

(21) Appl. No.: 11/961,176

(22) Filed: Dec. 20, 2007

(65) Prior Publication Data
US 2009/0160422 A1 Jun. 25, 2009

(51) Int. Cl.
G05F 1/613 (2006.01)
G05F 3/16 (2006.01)

(52) U.S. Cl. ......................... 323/223; 323/284

(58) Field of Classification Search .......... 323/222, 323/223, 282, 283, 284, 285
See application file for complete search history.

(56) References Cited

U.S. PATENT DOCUMENTS

| | | |
|---|---|---|
| 4,456,872 A | 6/1984 | Froeschle |
| 4,618,812 A | 10/1986 | Kawakami |
| 5,350,997 A | 9/1994 | Ghotbi et al. |
| 5,359,276 A | 10/1994 | Mammano |
| 5,552,694 A | 9/1996 | Appeltans |
| 5,568,044 A | 10/1996 | Bittner |
| 5,736,842 A | 4/1998 | Jovanovic |
| 5,798,635 A | 8/1998 | Hwang et al. |
| 5,889,392 A | 3/1999 | Moore et al. |
| 6,157,182 A | 12/2000 | Tanaka et al. |
| 6,163,143 A | 12/2000 | Shimamori |
| 6,204,650 B1 | 3/2001 | Shimamori |
| 6,215,288 B1 | 4/2001 | Ramsey et al. |
| 6,229,293 B1 | 5/2001 | Farrenkopf |
| 6,285,571 B1 | 9/2001 | Brooks et al. |
| 6,292,378 B1 | 9/2001 | Brooks |
| 6,348,779 B1 | 2/2002 | Sluijs |
| 6,348,780 B1 | 2/2002 | Grant |
| 6,351,162 B1 | 2/2002 | Schwartz |
| 6,356,063 B1 | 3/2002 | Brooks |
| 6,359,796 B2 | 3/2002 | Hartular et al. |
| 6,429,632 B1 | 8/2002 | Forbes et al. |
| 6,430,070 B1 | 8/2002 | Shi et al. |
| 6,459,602 B1 | 10/2002 | Lipcsei |
| 6,580,258 B2 * | 6/2003 | Wilcox et al. ............ 323/282 |
| 6,605,931 B2 | 8/2003 | Brooks |
| 6,621,256 B2 | 9/2003 | Muratov et al. |
| 6,696,861 B1 | 2/2004 | Baldwin et al. |
| 6,724,174 B1 | 4/2004 | Esteves et al. |
| 6,791,283 B2 | 9/2004 | Bowman et al. |
| 7,071,630 B1 * | 7/2006 | York ........................ 315/224 |
| 7,102,339 B1 * | 9/2006 | Ferguson |
| 7,102,340 B1 * | 9/2006 | Ferguson ................. 323/284 |
| 2001/0033503 A1 * | 10/2001 | Hamp et al. |
| 2002/0051373 A1 * | 5/2002 | Lipcsei |
| 2002/0080631 A1 * | 6/2002 | Kanouda et al. |
| 2002/0126512 A1 * | 9/2002 | Nakagawa et al. |
| 2002/0145891 A1 * | 10/2002 | Ling |
| 2002/0154524 A1 * | 10/2002 | Yamanaka et al. |
| 2005/0046399 A1 * | 3/2005 | Gan et al. |
| 2005/0206361 A1 * | 9/2005 | Ito ........................... 323/282 |

* cited by examiner

*Primary Examiner* — Harry Behm
*Assistant Examiner* — Matthew Grubb
(74) *Attorney, Agent, or Firm* — Knobbe Martens Olson & Bear, LLP

(57) ABSTRACT

A power conversion circuit operates in a discontinuous switching mode over a wide range of loading conditions and varies a coil peak current to maintain efficiency over the wide range of loading conditions. The coil peak current is adjustable based at least in part on a feedback signal generated in response to a load condition.

19 Claims, 15 Drawing Sheets

BOOST CONVERTER WITH ADAPTIVE COIL PEAK CURRENT

BACKGROUND

1. Field of the Invention

The invention generally relates to a power conversion circuit, and more particularly, relates to a boost converter that has an adaptive coil peak current while operating in a discontinuous switching mode.

2. Description of the Related Art

An inductor based boost converter typically has a switch controlled by a pulse width modulation (PWM) controller or a pulse frequency modulation (PFM) controller. The PWM controller uses an oscillator to generate a fixed frequency driving signal for the switch, and the driving signal's duty cycle can be varied to regulate an output voltage of the boost converter. The PWM controller can operate in a voltage mode to directly regulate the output voltage or in a current mode to indirectly regulate the output voltage by controlling a peak or an average current conducted by the switch. Both modes of operation can promote inefficiencies (e.g., switching loss or conduction loss) as load current changes.

The PFM controller does not necessarily have an oscillator and typically operates in a hysteretic mode. For example, the PFM controller is on for a burst period when the output voltage of the boost converter is less than a first level and off when the output voltage is greater than a second level. During each burst period, the PFM controller controls switching cycles for the switch. Each switching cycle involves turning on the switch until the switch conducts a fixed peak switching current and subsequently turning off the switch for a predetermined duration.

Similar to the PWM controller, the PFM controller may not operate efficiently as load current changes. For example, the fixed peak switching current is usually set for a maximum load condition. Operation under lighter load conditions can become inefficient with increased output voltage ripples and switching frequencies near an audible range. Prior methods have been proposed to improve efficiency for the PFM controller. The prior methods include operating the PFM controller in different modes in response to different load conditions.

SUMMARY

In one embodiment, the present invention solves these and other problems by providing a power conversion circuit that operates in a discontinuous switching mode over a wide range of loading conditions (e.g., substantially over an entire designed load range) and varies a coil peak current while operating in the discontinuous switching mode to maintain efficiency over the wide range of loading conditions. In one embodiment, the power conversion circuit is a boost converter that accepts a substantially direct current (DC) input voltage at a first level and supplies a substantially DC output voltage at a second level that can be greater than the first level. The boost converter includes an inductor (or coil) and a switching transistor (or semiconductor switch) to generate the output voltage. For example, a controller turns on the switching transistor periodically or intermittently to increase current (or transistor current) conducted by the switching transistor and current (or coil current) conducted by the inductor. When the transistor current or the coil current reaches a desired peak current level, the controller turns off the switching transistor for the remainder of that switching cycle. Thus, the switching transistor turns on in each switching cycle for a duration that varies with the desired peak current level. The coil current is directed to a load coupled to the output voltage when the switching transistor turns off. The controller maintains output voltage regulation and efficient operation for different load conditions by using feedback to adjust the desired peak current level and to control the number of switching cycles in a particular burst period for the switching transistor.

In one embodiment, the controller includes a modulator configured to generate a driving signal for alternately turning on and off the switching transistor, a feedback comparator, and a desired peak current circuit configured to generate an output to indicate the desired peak current level. The feedback comparator generates a feedback signal based on comparing a target reference (or a reference level) with a sensed signal indicative of a load condition. The desired peak current circuit varies the desired peak current level based at least in part on the feedback signal while the controller (or modulator) operates in the discontinuous switching mode. For example, the feedback signal transitions to a first state that enables the modulator to generate the driving signal when the sensed signal is less than (or falls below) the target reference and transitions to a second state that disables the modulator to deactivate the driving signal when the sensed signal is greater than (or rises above) the target reference. That is, the driving signal is enabled or disabled in response to a condition of the feedback signal.

In one embodiment, the feedback comparator includes hysteresis and the feedback signal does not transition to the first state until the sensed signal is less than the target reference by a first hysteretic amount (or a low threshold) nor transition to the second state until the sensed signal is greater than the target reference by a second hysteretic amount (or a high threshold). In other embodiments, the feedback comparator does not have hysteresis, but the controller operates in the discontinuous switching mode due to time delay in the feedback loop. The modulator is intermittently disabled in the discontinuous switching mode. Thus, the switching transistor may experience a burst of switching cycles when the modulator is enabled in between periods of inactivity when the modulator is disabled.

In one embodiment, the desired peak current circuit (or coil peak current decision circuit) varies the desired peak current level linearly. For example, the desired peak current circuit includes a buffer circuit, a capacitor, a current source and a current sink in one implementation. The capacitor is coupled to an input of the buffer circuit. The current source charges the capacitor while the feedback signal is in the first state. The current sink discharges the capacitor when the feedback signal transitions from the first state to the second state. An output of the buffer circuit indicates the desired peak current level which increases linearly while the modulator is enabled (e.g., when the feedback signal is in the first state) and decreases (e.g., by a predetermined amount or to a predetermined level) each time the modulator is disabled (e.g., when the feedback signal transitions from the first state to the second state). For example, the desired peak current level increases when a condition of the feedback signal indicates that the load condition is below a reference level and decreases when the feedback signal changes from a first condition to a second condition.

In another embodiment, the desired peak current circuit varies the desired peak current level in discrete steps. In some implementations, the desired peak current level is varied based on the feedback signal and a clock signal that tracks the driving signal for the switching transistor. For example, the desired peak current circuit monitors the clock signal to determine the number of switching cycles in the driving signal and increases the desired peak current level when the number of switching cycles exceeds a predetermined amount since a previous adjustment to the desired peak current level. The desired peak current level decreases when the feedback signal indicates that the load condition has changed from being below the reference level to being above the reference level. Hysteretic techniques can be used to ensure stable transitions in the feedback signal.

In one example implementation, the desired peak current circuit includes a buffer circuit, a capacitor, a clock divider or a clock counter, a current source and a current sink. The clock divider or the clock counter receives the clock signal and outputs a one-shot pulse after every M cycles of the clock signal. The clock divider or the clock counter resets when the desired peak current level is adjusted. The current source charges the capacitor by a first predefined amount (or a first discrete amount) in response to the one-shot pulse. The current sink discharges the capacitor by a second predefined amount (or a second discrete amount) when the feedback signal transitions from the first state to the second state. The capacitor is coupled to an input of the buffer circuit and the output of the buffer circuit indicates the desired peak current level.

In another example implementation, the desired peak current circuit is realized with digital logic circuits including the clock divider or the clock counter and a binary counter. The binary counter increases by a first predefined step in response to an up signal and decreases by a second predefined step in response to a down signal. The output of the binary counter is a digital word that indicates the desired peak current level. The up signal is generated based at least in part on the one-shot pulse provided by the clock divider or the clock counter. For example, the up signal increases the digital word by a predefined step (or a predetermined amount) when the feedback signal does not transition from the first state to the second state within M cycles of the clock signal after a previous adjustment to the digital word as indicated by the one-shot pulse. The down signal is generated based at least in part on the feedback signal. For example, the down signal decreases the binary counter each time the feedback signal is in the second state for more than a predetermined duration, when the feedback signal transitions from the first state to the second state, or when the feedback signal transitions from the first state to the second state within L cycles of the clock signal in a particular active period of the modulator. During steady state operation, the digital word can have two or fewer different levels to indicate two or fewer desired peak current levels. The output of the binary counter is an N-bit digital word and an N-bit digital-to-analog converter (DAC) translates the N-bit digital word into an analog signal for the modulator in one embodiment. In one embodiment, the binary counter stops increasing after reaching a maximum value and stops decreasing after reaching a minimum value.

In one application, the boost converter is used to power light sources (e.g., light emitting diodes) coupled to the output voltage. The light sources are used to backlight visual displays and the intensity of the light sources can be adjusted for different operating conditions or user preference. Various dimming methods (e.g., analog or digital) can be used to adjust the intensity of the light sources. One of the dimming methods (i.e., direct digital dimming) provides an external signal to intermittently or periodically block power to the light sources. The external signal can be used by the desired peak current circuit to maintain the desired peak current level during times when power to the light sources is blocked. That is, the desired peak current level does not change during inactive durations of direct digital dimming in which power is not provided to the light sources.

The modulator can use PFM techniques or fixed frequency techniques to generate the driving signal. In one embodiment, the modulator is a pulse frequency modulator that generates a driving signal to turn the switching transistor on for variable durations and off for substantially fixed durations. The pulse frequency modulator comprises a peak current comparator, an off-time generator and a driver circuit. The peak current comparator compares a detected signal indicative of the coil current (or transistor current) with the desired peak current level generated from the output of the desired peak current circuit. The off-time generator receives an output of the peak current comparator and generates the clock signal with active durations that vary proportionally with the desired peak current level and substantially fixed inactive durations. The driver circuit receives the clock signal and generates the driving signal to control the switching transistor.

In another embodiment, a modulator uses fixed frequency techniques to generate a driving signal that turns the switching transistor on at periodic intervals for substantially constant frequency operation. For example, the modulator comprises an oscillator, a peak current comparator and a driver circuit. The oscillator generates a periodic signal with a predetermined (or desired) frequency. The periodic signal starts active durations of the clock signal at regular intervals. The peak current comparator compares the detected signal indicative of the coil current with the desired peak current level and stops the active durations of the clock signal when the coil current exceeds the desired peak current level. The driver circuit receives the clock signal and generates the driving signal to control the switching transistor.

In one embodiment, a method for controlling a switch in a DC-to-DC power converter includes comparing a sensed signal indicative of a load condition with a target reference to generate an outer feedback signal and varying a desired peak current level responsive to the generated outer feedback signal. A sensed coil current is compared with the desired peak current level to generate an inner feedback signal and a driving signal is generated in response to the inner feedback signal. The driving signal alternates between an active state in which the switch conducts a temporally increasing coil current and an inactive state in which the switch ceases to conduct current. The method further includes enabling, responsive to a first condition of the outer feedback signal, the driving signal to control the switch. In addition, the method includes disabling, substantially over an entire designed load range and responsive to a second condition of the outer feedback signal, the driving signal from controlling the switch. For example, the switch is prohibited from conducting current in response to the second condition of the outer feedback signal and operates in a discontinuous switching mode over the entire designed load range of the DC-to-DC power converter.

In one embodiment, the desired peak current level increases linearly responsive to the first condition of the outer feedback signal and decreases to a predetermined level or by a predetermined amount responsive to the second condition of the outer feedback signal. The desired peak current level can be varied in discrete steps, suspended during inactive durations in which power is not provided to a load, further varied in response to a clock signal that tracks the driving signal, or adjusted in accordance with the various embodiments described above.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

These drawings and the associated description herein are provided to illustrate embodiments and are not intended to be limiting.

DETAILED DESCRIPTION OF EMBODIMENTS

Although particular embodiments are described herein, other embodiments, including embodiments that do not provide all of the benefits and features set forth herein, will be apparent to those of ordinary skill in the art.

Figure 1:
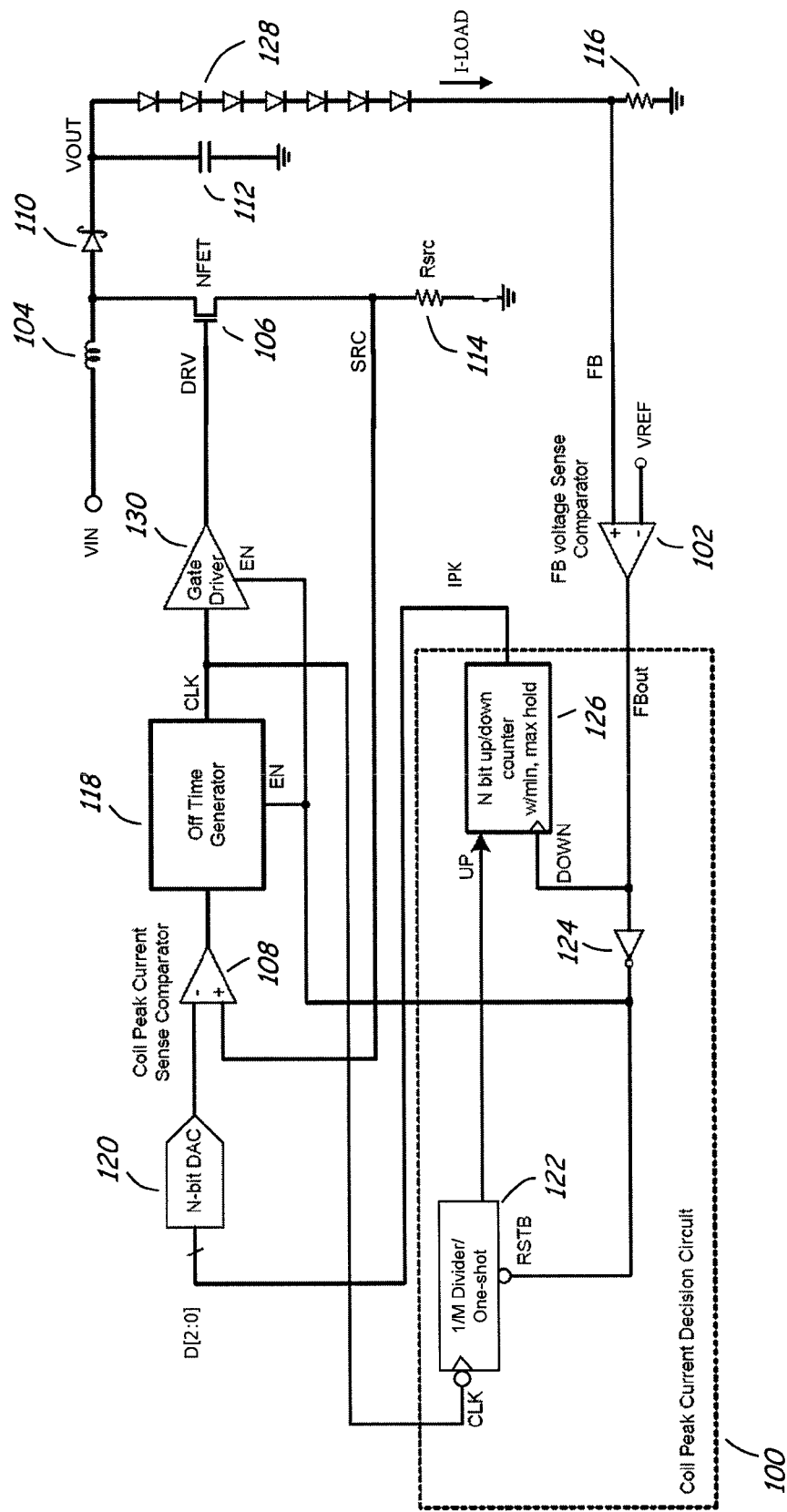
FIG. 1 is a circuit diagram for one embodiment of a boost converter in accordance with the present invention.

FIG. 1 is a simplified circuit diagram for one embodiment of a power converter in accordance with the present invention. By way of example, the power converter is a current mode boost converter that accepts a substantially DC input voltage (VIN) and produces a substantially DC output voltage (VOUT) which can be greater than the input voltage. The output voltage can be used to power a load 128, e.g., a plurality of light emitting diodes (LEDs) connected in series or a string of LEDs. The boost converter can adjust the brightness of the LEDs by varying the power (or load current) provided to the load 128. In some applications, the load current (I-LOAD) varies over a wide range to accommodate a wide range of ambient lighting conditions and/or user preferences.

The boost converter includes an input inductor (or coil) 104, a switch 106, a rectifying diode 110, a filter (or output) capacitor 112, and sense resistors 114, 116. In one embodiment, the switch 106 is a switching transistor or a semiconductor switch (e.g., an N-type filed effect transistor or NFET). The input inductor 104 is coupled between the input voltage and a drain terminal of the switch 106. The first sense resistor (Rsrc) 114 is coupled between a source terminal of the switch 106 and ground. The rectifying diode 110 has an anode coupled to the drain terminal of the switch 106 and a cathode coupled to the output voltage. The filter capacitor 112 is coupled between the output voltage and ground. The second sense resistor 116 is coupled between the load 128 and ground.

In one embodiment, the switch 106 is controlled by a controller which outputs a driving signal (DRV) to a gate terminal of the switch 106. The driving signal has active states and inactive states. During each active state of the driving signal, the switch 106 is turned on (or closed) to increase current (or coil current) flowing through the input inductor 104. The current conducted by the input inductor 104 is selectively coupled to the output voltage by the rectifying diode 110 (e.g., when the switch 106 turns off). The filter capacitor 112 reduces ripple voltage to maintain a substantially DC output voltage.

In one embodiment, the controller includes a modulator that generates the driving signal for alternately turning on and off the switch 106. The modulator receives an enable signal (EN). When the modulator is disabled (i.e., the enable signal is inactive), the modulator is inactive (or off) and the driving signal is also inactive to turn off (or open) the switch 106. When the modulator is enabled, the driving signal alternates between active and inactive states to cause the switch 106 to go through one or more switching cycles. In each switching cycle, the switch 106 turns on until the current conducted by the switch 106 reaches a desired peak level. In the configuration shown in FIG. 1, the modulator is a PFM modulator and the switch 106 turns off for a substantially fixed duration before starting the next switching cycle. The PFM controller uses logic/timing circuits and advantageously does not use an oscillator to implement the switching cycles. The repetition rate (or frequency) of the switching cycles depends on the desired peak current level.

In one embodiment, the PFM modulator includes a peak current comparator 108, an off-time generator 118 and a driver circuit 130. The enable signal is provided to the off-time generator 118 and/or the driver circuit 130. An inner feedback loop of the controller monitors current flowing through the switch 106 and outputs a peak current detection signal to the off-time generator 118. For example, the switch 106 and the input inductor 104 conduct substantially the same current (e.g., the coil current) that increases linearly when the switch 106 is on. The inner feedback loop senses a voltage (SRC) across the first sense resistor 114 to generate a detected signal indicative of the coil current level. The peak current comparator 108 compares the detected signal with a desired peak current level (IPK) to generate the peak current detection signal. The desired peak current level can advantageously vary with the output voltage or the load current substantially over an entire designed load range. The off-time generator 118 receives the peak current detection signal and generates a clock signal (CLK) with active durations that vary with the desired peak current level and substantially fixed inactive durations. The driver circuit 130 receives the clock signal and generates the driving signal to control the switch 106.

In one embodiment, an outer feedback loop monitors the output voltage or the load current to provide closed-loop and continuation regulation of the output. That is, the outer feedback loop monitors a load condition or senses the load power to generate the enable signal for the modulator. For example, the outer feedback loop generates an outer feedback signal based on comparing a sensed signal indicative of the load condition with a target reference (or reference level) indicative of a desired load condition. In response to a first condition of the outer feedback signal, the enable signal is activated to allow the driving signal of the modulator to control the switch 106. In response to a second condition of the outer feedback signal, the enable signal is deactivated to prohibit the driving signal from controlling the switch 106. Thus, the controller operates in a discontinuous switching mode in which the switch 106 has periods of activity in between periods of rest. The periods of activity occur when the modulator is enabled and the switch 106 goes through one or more switching cycles (e.g., a burst of switching cycles) during each period of activity. The periods of rest occur when the modulator is disabled and the switch 106 is off during the rest periods.

In the configuration shown in FIG. 1, the outer feedback loop senses a voltage (FB) across the second sense resistor 116 to indicate the load condition. The voltage (or sensed signal) indicative of the load condition is provided to a non-inverting input of a feedback comparator 102. The feedback comparator 102 compares the sensed signal indicative of the load condition with the target reference (VREF) at an inverting input to generate the outer feedback signal (FBout). In one embodiment, the outer feedback signal is provided to an inverter logic circuit 124 to generate the enable signal. Thus, the modulator is enabled when the sensed signal is less than the target reference and the outer feedback signal transitions to a first state. Similarly, the modulator is disabled when the sensed signal is greater than the target reference and the outer feedback signal transitions to a second state. Hysteresis in the feedback comparator 102 and/or delay in the outer feedback loop cause the controller to operate in the discontinuous switching mode in which the modulator is alternately enabled and disabled.

In one embodiment, the controller operates in the discontinuous switching mode substantially over an entire designed load range. For example, the controller does not change operating modes depending on light load conditions or heavy load conditions. The controller uses the same operating mode (i.e., the discontinuous switching mode) to handle a wide range of loading conditions. The controller maintains a relatively fast output response (e.g., regulation of the output voltage with reduced noise and ripple) by increasing or decreasing the desired peak current level depending on the load conditions. In one embodiment, the outer feedback signal is used to vary the desired peak current level that is provided to the inner feedback loop (i.e., the peak current comparator 108).

In the configuration shown in FIG. 1, a desired peak current circuit (or coil peak current decision circuit) 100 generates a variable desired peak current level (IPK) while the controller operates in the discontinuous switching mode. By way of example, the desired peak current circuit 100 is implemented using digital logic circuits and the desired peak current level is adjustable (e.g., increased or decreased) in discrete steps. The desired peak current circuit 100 varies the desired peak current level based on the outer feedback signal (FBout) and the clock signal (CLK) that tracks the driving signal for the switch 106. Other configurations to generate the variable desired peak current level are possible. Some example configurations that use analog circuits, adjust the desired peak current level linearly, or only use the outer feedback signal to make adjustments are described in further details below with reference to other figures.

The desired peak current circuit 100 in FIG. 1 includes a clock divider 122 and a binary counter 126. The clock divider 122 receives the clock signal and outputs a one-shot pulse after every M (or a predetermined number of) cycles of the clock signal. An inverted version of the outer feedback signal is provided to a reset input of the clock divider 122. The binary counter 126 increases by a first predefined step (or a first discrete amount) in response to an up signal (UP) and decreases by a second predefined step (or a second discrete amount) in response to a down signal (DOWN). The first predefined step and the second predefined step can have the same value or different values. An output of the binary counter 126 indicates the desired peak current level.

In the configuration shown in FIG. 1, the up signal is the one-shot pulse from the clock divider 122 and the down signal is the outer feedback signal from the feedback comparator 102. Thus, the clock divider 122 receives the clock signal to monitor the number of switching cycles in the driving signal for the switch 106 and increases the desired peak current level by one level whenever output regulation as indicated by the outer feedback signal is not met after every M switching cycles. Once the output regulation is met as indicated by the outer feedback signal transitioning states, the modulator is disabled to prohibit further switching cycles and the desired peak current is decreased by one level for the next active period of the modulator.

In one embodiment, the binary counter 126 is an N-bit up/down counter with optional minimum and maximum hold features. For example, the output of the binary counter 126 does not change in response to the up signal upon reaching a maximum value or in response to the down signal upon reaching a minimum value. The output of the binary counter 126 is a digital word (e.g., D[N−1:0]) corresponding to the desired peak current level. The number of bits (i.e., N) in the binary word determines the resolution and range of the desired peak current level. In one embodiment, the output of the binary counter 126 is provided to an N-bit digital-to-analog converter (DAC) 120 and converted to an analog signal that is provided to an inverting input of the peak current comparator 108.

Figure 2:
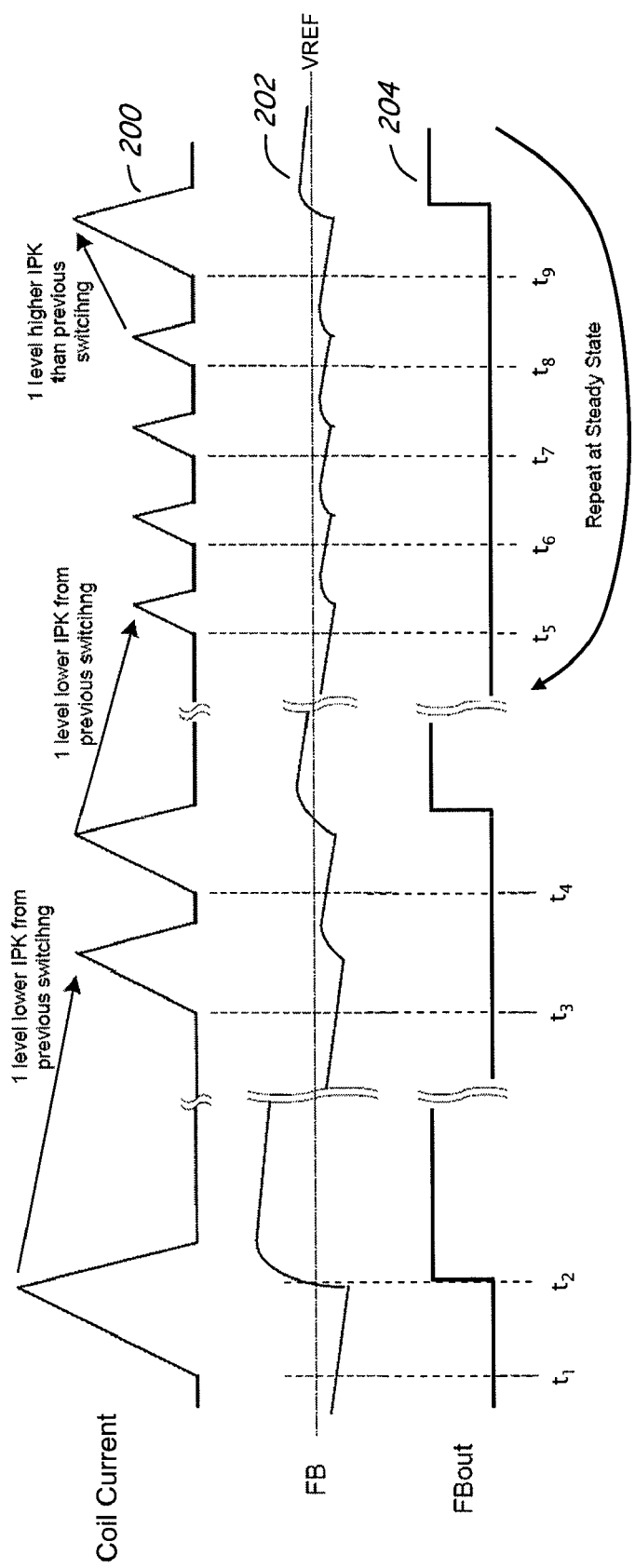
FIG. 2 illustrates select waveforms as a function of time in the boost converter shown in FIG. 1.

FIG. 2 illustrates examples of select waveforms as a function of time in the boost converter shown in FIG. 1. A graph 200 shows current (or coil current) conducted by the input inductor 104 as a function of time. A graph 202 shows the sensed voltage (FB) across the second sense resistor 116 to indicate the load condition (e.g., output voltage or load current) as a function of time. A graph 204 shows the outer feedback signal (FBout) generated by the feedback comparator 102 as a function of time.

At time $t_1$, the sensed voltage is less than the target reference (VREF) and the outer feedback signal has a first logic level (e.g., logic low) that enables the modulator to generate the driving signal for controlling the switch 106. In the example shown in FIG. 2, the switch 106 turns on at time $t_1$ to start a first switching cycle and the coil current begins to increase until the coil current reaches a peak level determined by the desired peak current level (IPK). When the coil current reaches the peak level, the switch 106 turns off and the coil current begins to decrease. While the coil current is increasing, the sensed voltage indicative of the load condition continues to decrease below the target reference because the increasing coil current is conducted by the switch 106 and the energy being stored in the input inductor 104 is not provided to the filter capacitor 112 and/or the load 128 yet. When the switch 106 turns off, the coil current decreases as the energy stored in the input inductor 104 is provided to the filter capacitor 112 and the load 128, and the sensed voltage increases correspondingly.

In the example shown in FIG. 2, the sensed voltage increases above the target reference at time $t_2$ and the outer feedback signal transitions to a second logic level (e.g., logic high) to disable the modulator. The input inductor 104 has not completely discharged its stored energy to the output at time $t_2$. Thus, the sensed voltage continues to increase beyond the target reference as the input inductor 104 continues to provide power to the output after the modulator is disabled. In the example shown in FIG. 2, the peak current level for the first switching cycle appears to be relatively high and the modulator is disabled after one switching cycle during a first active period. In the embodiment shown in FIG. 1, the desired peak current level is decreased one level when the outer feedback signal changes to the second logic level (e.g., when the modulator is disabled at time $t_2$).

After the modulator is disabled, the sensed voltage eventually decreases and falls below the target reference. When the sensed voltage is less than the target reference, the outer feedback signal has the first logic level to enable the modulator for a second active period. After the modulator is enabled, the switch 106 goes through one or more switching cycles before the modulator is disabled again. For example, the switch 106 goes through two switching cycles (e.g., at times $t_3$ and $t_4$) in the second active period before the outer feedback signal transitions to the second logic level to disable the modulator. In each of the switching cycles during the second active period, the switch 106 turns on until the coil current reaches a peak current level that is one level lower than the peak current level in the previous active period of the modulator. When the modulator is disabled after two switching cycles, the desired peak current level is further reduced by another level for a subsequent active period of the modulator.

For example, the coil current has a relatively low peak current level for initial switching cycles (e.g., at times $t_5$-$t_8$) during a third active period of the modulator. In an example embodiment, the clock divider 122 in FIG. 1 outputs a pulse after every four (e.g., M=4) cycles of the clock signal to increase the desired peak current level. That is, the peak current level for the coil current increases one level after every four switching cycles during an active period of the modulator. In the example shown in FIG. 2, the sensed voltage rises above the target reference during the fifth switching cycle to end the third active period of the modulator and the desired peak current level is decreased by one level in response to the end of the third active period.

As shown in FIG. 2, the controller operates in a discontinuous switching mode in which the modulator is alternately enabled to allow one or more switching cycles and disabled to inhibit switching cycles. In the embodiment shown in FIG. 1, the feedback comparator 102 does not have hysteresis, but hysteresis appears in the output voltage of the boost converter due to time delay. For example, the sensed voltage indicative of the output voltage increases above the target reference when the modulator is turned off and decreases below the target reference when the modulator is turned on. The sensed voltage is either above or below the target reference and does not stay at the target reference. The time delay can be caused by a feedback loop (e.g., a delay in response by the switch 106 to the outer feedback signal). The time delay can also be caused by the input inductor 104 which initially stores energy such that no power is provided to the output immediately after the modulator is enabled. The input inductor 104 may also continue to discharge current to the output after the modulator is disabled.

In the current mode boost converter of FIG. 1, the desired peak current level can be set to different levels (e.g., more than two) to maintain good efficiency over an entire designed load range. For example, the desired peak current level is adjusted based on the outer feedback signal and adapts to various load conditions as indicated by the sensed voltage. The boost converter advantageously stays in the discontinuous switching mode over the entire designed load range and does not need to use other switching modes that may require a slower response or more complicated feedback scheme (e.g., feedback schemes that use loop compensation or slope compensation). Operating only in the discontinuous switching mode advantageously minimizes circuit complexity and die size of the controller for the boost converter. The boost converter minimizes switching loss by reducing the number of switching cycles under relatively light load conditions and minimizes conduction loss by varying the desired peak current level as needed to meet load demands. Since the discontinuous switching mode does not require loop compensation in the outer feedback loop, the desired peak current level can be stepped up or down quickly for fast step load responses (e.g., sudden load changes). During steady state operation, the desired peak current level can alternate between two or fewer different levels. Steady state operation is discussed in further detail with reference with FIGS. 3 and 6.

Figure 3:
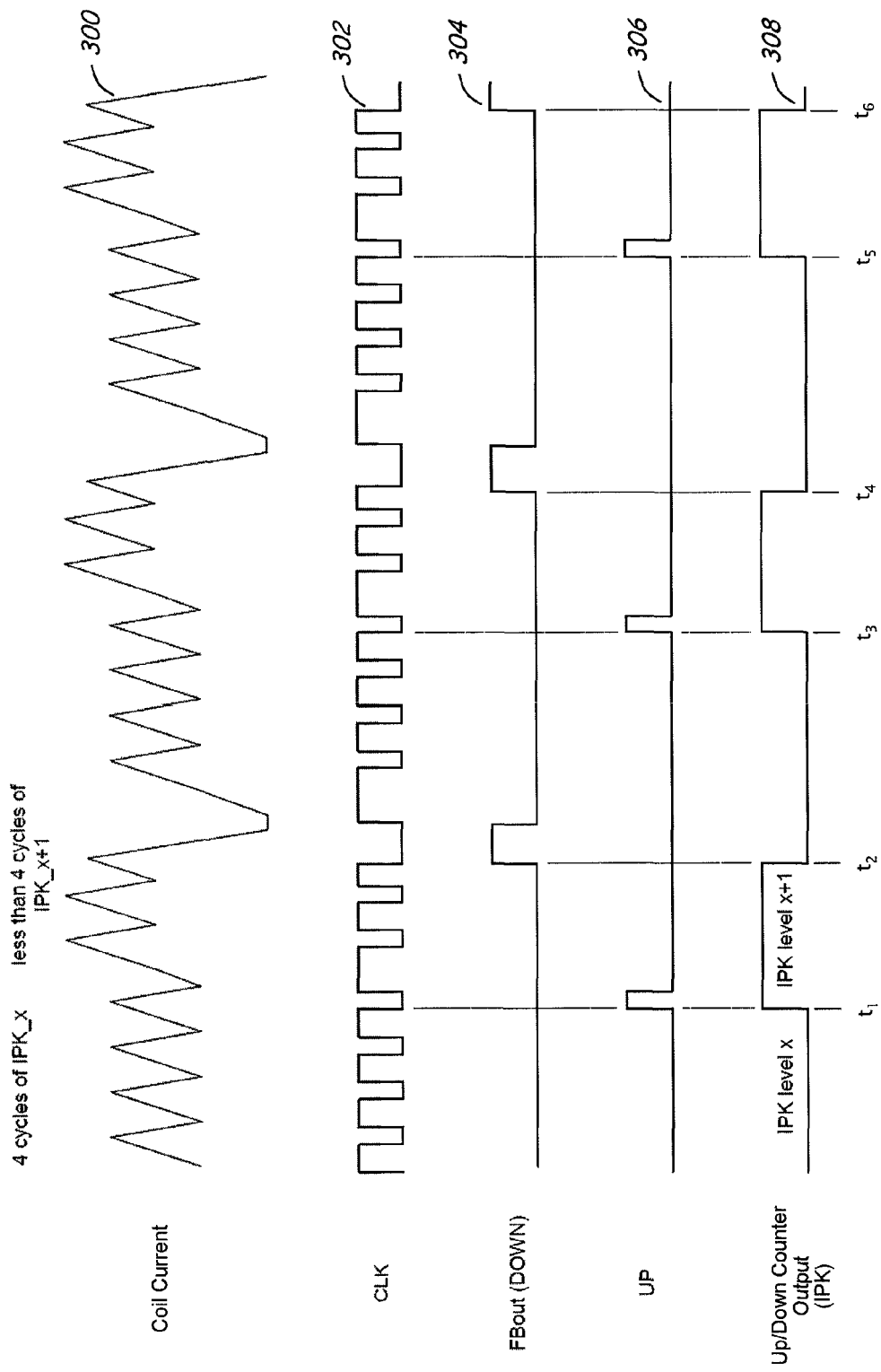
FIG. 3 illustrates select waveforms as a function of time during steady state operation in the boost converter shown in FIG. 1.

FIG. 3 illustrates select waveforms as a function of time during steady state operation in the boost converter shown in FIG. 1. A graph 300 shows coil current conducted by the input inductor 104 as a function of time. A graph 302 shows a clock signal that tracks the driving signal for the switch 106 and is provided to the clock divider 122 to generate an up signal (UP) for the binary counter 126. The up signal is shown in a graph 306. A graph 304 shows an outer feedback signal (FBout) generated by the feedback comparator 102. The outer feedback signal is also a down signal for the binary counter 126. Finally, a graph 308 shows the variable desired peak current level (IPK) generated at an output of the binary counter 126.

By way of example, the clock divider 122 outputs a pulse after every four (e.g., M=4) cycles of the clock signal. A designer can choose a different number of cycles to optimize operation for different applications. The clock divider 122 resets in response to a pulse in the down signal. As shown in the graph 306, the clock divider 122 outputs a pulse at time $t_1$ and additional pulses at times $t_3$ and $t_5$ after resetting at times $t_2$ and $t_4$ respectively.

The desired peak current level increases by one level in response to a pulse in the up signal and decreases by one level in response to a pulse in the down signal. For example, the desired peak current level increases from a first level (IPK level x) to a second level (IPK level x+1) at time $t_1$. The desired peak current level decreases from the second level to the first level at time $t_2$. Correspondingly, the coil current reaches a first peak current level associated with the first level of the desired peak current level for switching cycles before time $t_1$ and reaches a second peak current associated with the second level of the desired peak current level between times $t_1$ and $t_2$.

At time $t_2$, the outer feedback signal indicates that a sensed signal indicative of the load condition is greater than a target reference and the modulator is turned off to start an inactive period. The inactive period ends when the sensed signal is less than the target reference. As shown in FIG. 3, the desired peak current level has about two different levels during steady state operation as the sensed signal fluctuates about the target reference.

Figure 4:
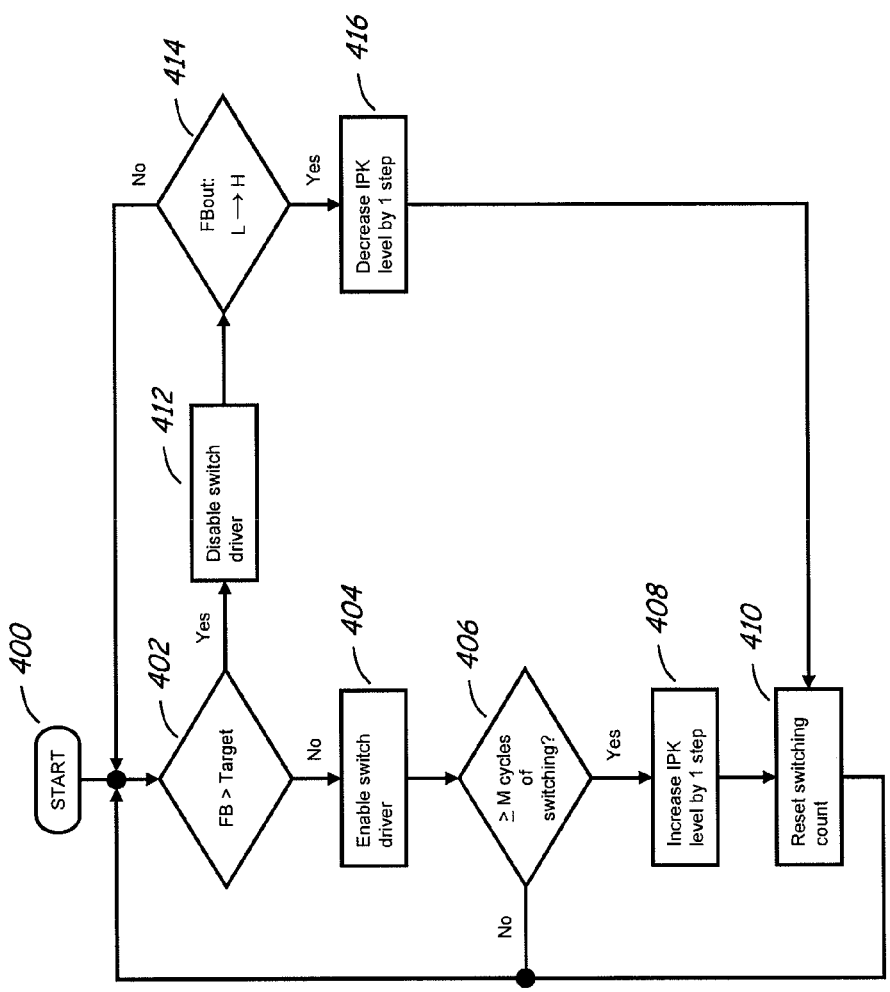
FIG. 4 is a flow chart for one embodiment of a process to adjust a desired peak current level.

FIG. 4 is a flow chart for one embodiment of a process to adjust a desired peak current level (IPK) in a current mode power converter. The process can be started at step 400 after power is provided to the power converter or after a predetermined delay following power up. The process begins by determining if a sensed signal (FB) indicating a load condition is greater than a target reference (Target) at step 402. If the sensed signal is not greater than the target reference, a modulator is enabled at step 404 to generate a driving signal for a switch in the power converter and the process proceeds to step 406. At step 406, the process determines if the switch has gone through at least M cycles of switching. In each switching cycle, the switch is turned on until the switch conducts a peak current determined by the desired peak current level. If step 406 determines that the switch has not gone through M cycles of switching yet, the process returns to step 402. If step 406 determines that the switch has gone through at least M cycles of switching, the desired peak current level is increased by a first predetermined amount at step 408. The process then proceeds to step 410, which resets a counter that tracks the number of switching cycles for the switch since a previous adjustment to the desired peak current level before returning to step 402.

At step 402, if the sensed signal is greater than the target reference, the modulator is disabled at step 412 before the process proceeds to step 414. At step 414, the process determines if the sensed signal has made a recent transition from being less than the target reference to being greater than the target reference as evidenced by a rising edge or a falling edge of a feedback signal (FBout). For example, the feedback signal is derived from a comparison of the sensed signal to the target reference. The feedback signal transitions from a first state (L) to a second state (H) when the sensed signal rises above or falls below the target reference. If the sensed signal made a recent transition from being less than the target reference to being greater than the target reference, the process proceeds to step 416 which decreases the desired peak current level by a second predetermined amount before proceeding to step 410. Otherwise, the process returns to step 402.

In the example process shown in FIG. 4, the desired peak current level is decreased by the second predetermined amount at each rising edge of the feedback signal. The desired peak current level is increased by the first predetermined amount when the sensed signal does not exceed the target reference within M switching cycles for the switch after a previous adjustment to the desired peak current level.

Figure 5:
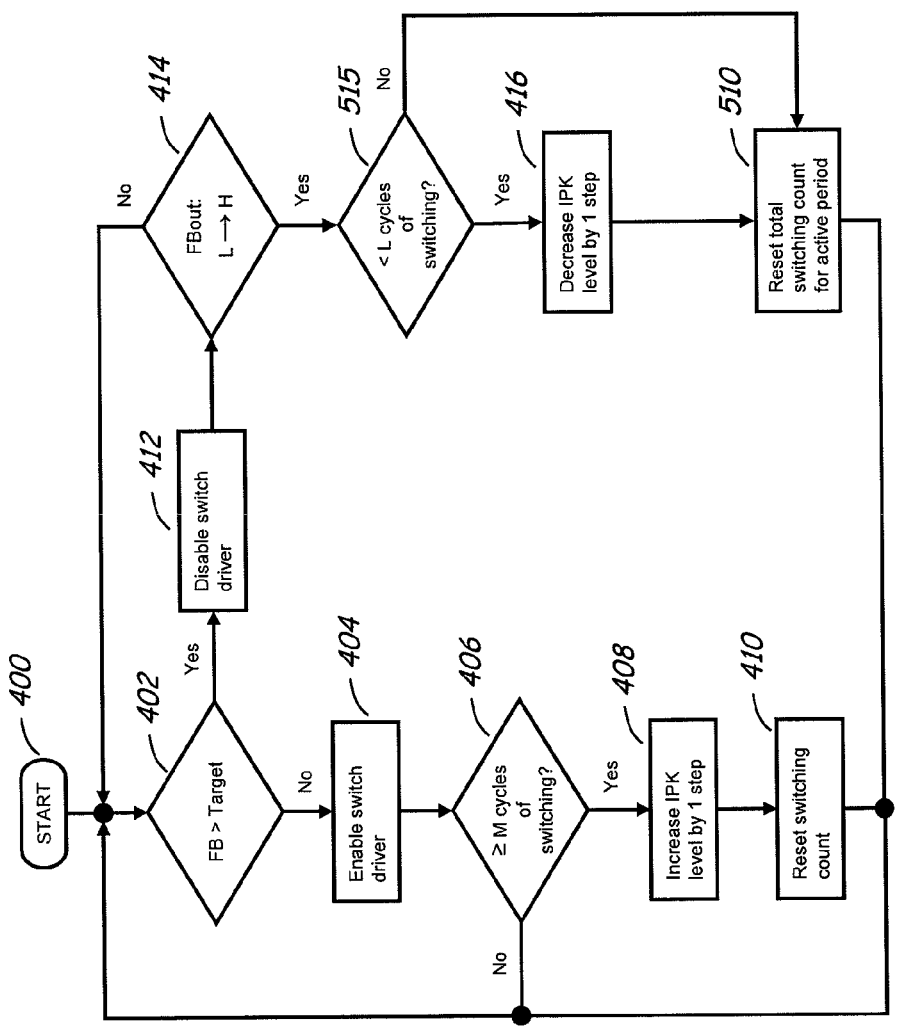
FIG. 5 is a flow chart for another embodiment of a process to adjust a desired peak current level.

FIG. 5 is a flow chart for another embodiment of a process to adjust a desired peak current level. The process shown in FIG. 5 is substantially similar to the process shown in FIG. 4 with an additional step 515 inserted in between steps 414 and 416 and a new step 510 to replace step 410 in the process that flows from step 416 to step 402. The process proceeds from step 414 to step 515 if the process determines that the sensed signal had made a recent transition from being less than the target reference to being greater than the target reference at step 414. At step 515, the process determines if the switch has gone through less than L cycles of switching during the recently terminated active period of the modulator. If the switch has gone through less than L switching cycles, the process proceeds to step 416 which decreases the desired peak current level by the second predetermined amount before proceeding to step 510 which resets a counter that tracks the total number of switching cycles in an active period of the modulator. If the switch has gone through at least L switching cycles, the process skips step 416 and goes to step 510. Other steps of the process shown in FIG. 5 are not discussed in further detail because of their similarity to the steps in FIG. 4 which are discussed above.

Figure 6:
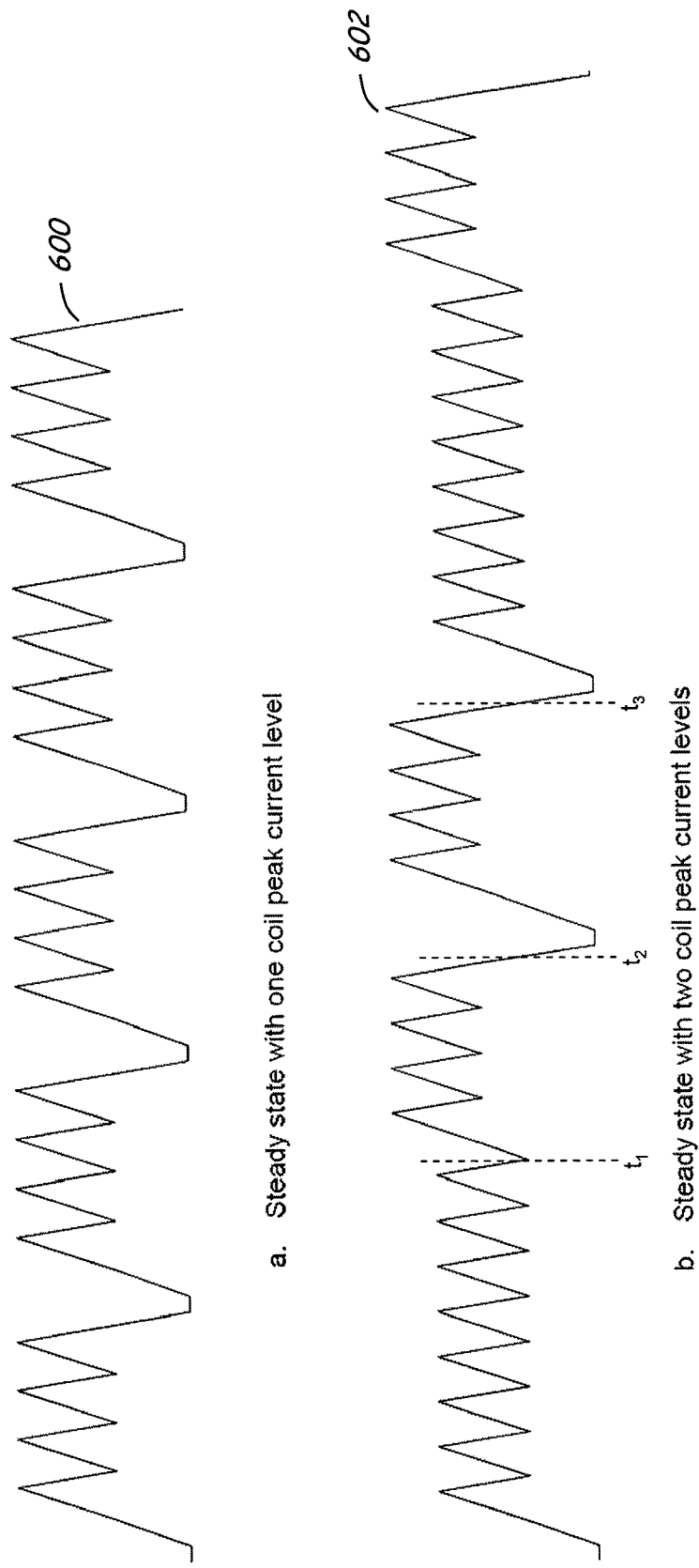
FIG. 6 illustrates possible coil current waveforms using the process described in FIG. 5.

FIG. 6 illustrates possible coil current waveforms using the process described in FIG. 5. The coil current waveforms shown in FIG. 6 correspond to coil currents during steady state operation using the process of FIG. 5. A graph 600 shows a first coil current waveform that has substantially the same peak current level during steady state operation. That is, the desired peak current level is neither increased nor decreased during steady state operation in which the modulator is intermittently activated to go through one or more (e.g., four) switching cycles. For example, the desired peak current level does not increase because the switch does not go through more than M (e.g., four) switching cycles before the sensed signal becomes greater than the target reference, thereby terminating an active period of the modulator. At the same time, the desired peak current level does not decrease because the switch goes through at least L (e.g., three) switching cycles during each active period of the modulator. A designer can choose other numbers for M and L to optimize operation for particular applications.

A graph 602 shows a second coil current waveform that has two peak current levels during steady state operation. By way of example, M is set at eight and L is set at six for the second coil current waveform. Thus, the desired peak current level increases after eight switching cycles at time $t_1$ (e.g., number of switching cycles$\geq$M). At time $t_2$, the modulator is disabled because the sensed signal is greater than the target reference. However, the desired peak current level does not decrease because the total number of switching cycles in the recently terminated active period is 12, which is greater than L. In the subsequent active period that ends at time $t_3$, the total number of switching cycles is four, which is less than L, and the desired peak current level is decreased at time $t_3$. Thus, depending on load conditions and design parameters (e.g., M or L), the coil current can have one or two peak current levels during steady state operation using the process described in FIG. 5.

Figure 7:
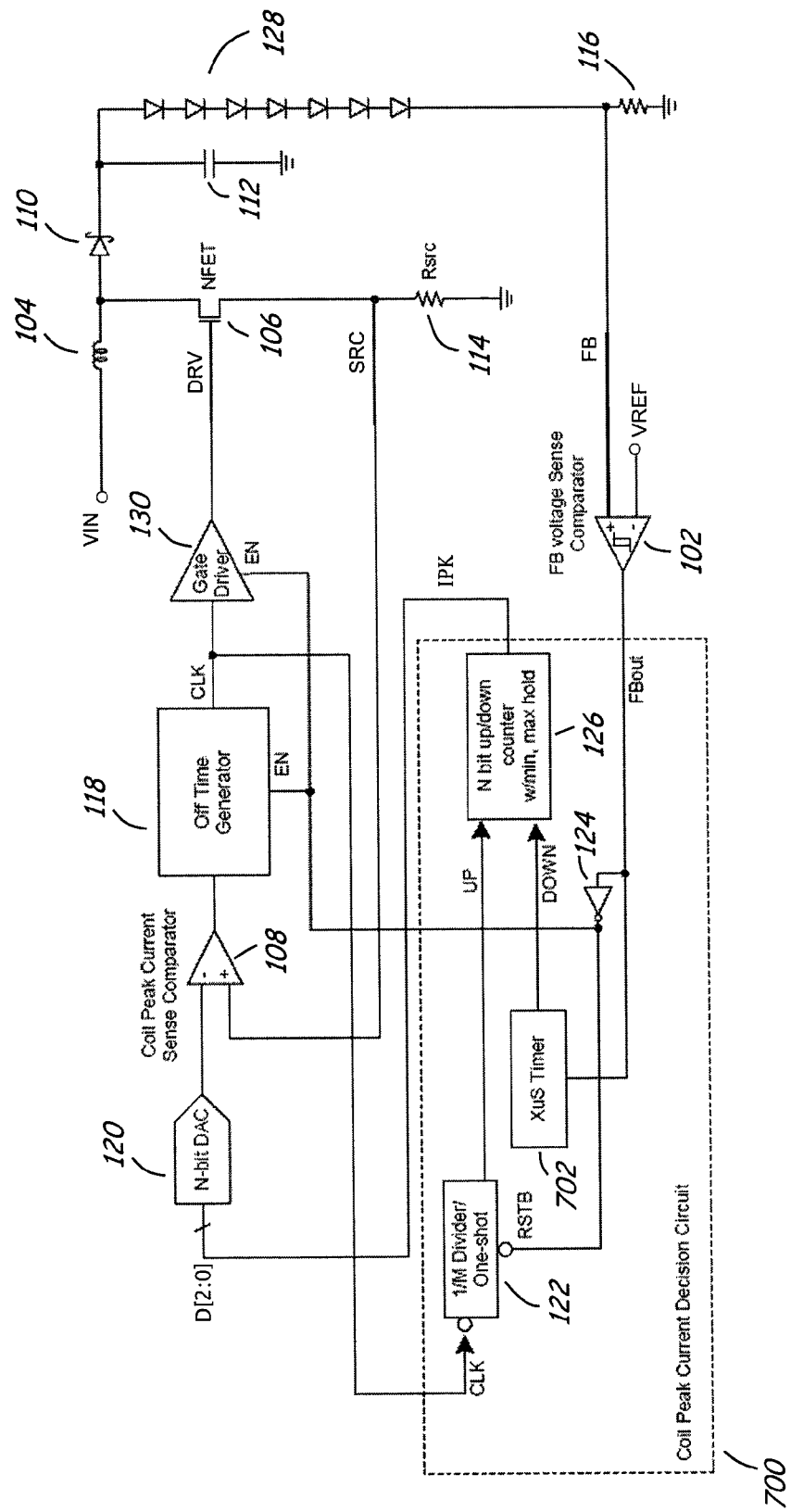
FIG. 7 is a circuit diagram for another embodiment of a boost converter in accordance with the present invention.

FIG. 7 is a circuit diagram for another embodiment of a boost converter in accordance with the present invention. The boost converter shown in FIG. 7 is substantially similar to the boost converter shown in FIG. 1 except a desired peak current circuit 700 shown in FIG. 7 has an additional timer circuit 702 that generates a down signal in a different manner than the desired peak current circuit 100 shown in FIG. 1. Furthermore, the boost converter shown in FIG. 7 includes a feedback comparator 102 with hysteresis while the feedback comparator 102 shown in FIG. 1 does not have hysteresis. However, the various boost converters disclosed herein can work with either type of feedback comparator.

The desired peak current circuit 700 uses digital logic to generate a desired peak current level (IPK) that varies in discrete steps. The desired peak current level increases in response a pulse in an up signal (UP) that occurs after every M cycles of a clock signal (CLK). The desired peak current level decreases in response to a pulse in a down signal (DOWN) that occurs when the outer feedback signal (FBout) is in a particular state (or condition) for greater than a predetermined duration. For example, the outer feedback signal is provided to the timer circuit 702 and the timer circuit 702 outputs the down signal to the binary counter 126.

Figure 8:
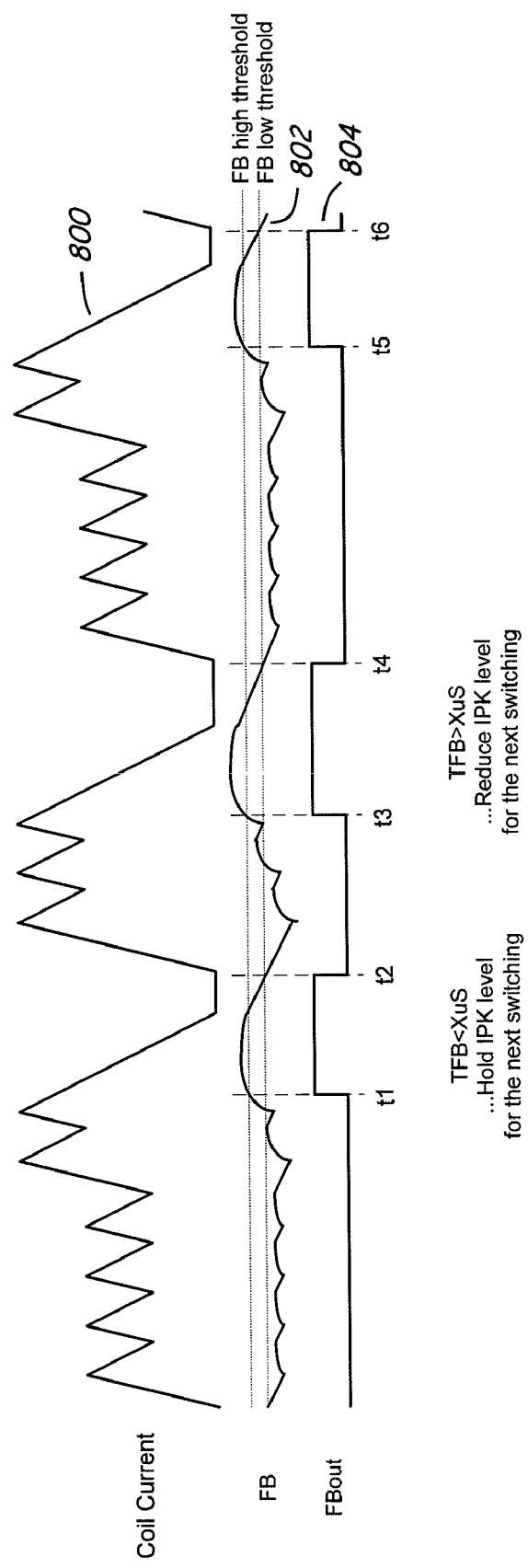
FIG. 8 illustrates select waveforms as a function of time in the boost converter shown in FIG. 7.

FIG. 8 illustrates select waveforms as a function of time in the boost converter shown in FIG. 7 to further explain operation of the timer circuit 702. A graph 800 shows a coil current conducted by the input inductor 104 as a function of time. A graph 802 shows a sensed voltage (FB) indicative of load conditions as a function of time. Finally, a graph 804 shows an outer feedback signal (FBout) generated from the sensed voltage as a function of time.

In the example shown in FIG. 8, the outer feedback signal transitions from a logic low to a logic high whenever the sensed voltage exceeds a high threshold (e.g., at times $t_1$, $t_3$, $t_5$) and transitions from a logic high to a logic low whenever the sensed voltage is less than a low threshold (e.g., at times $t_2$, $t_4$, $t_6$). In the embodiment shown in FIG. 7, the difference between the high threshold and the low threshold is mostly due to hysteresis in the feedback comparator 102. The down signal for the binary counter 126 is generated from the outer feedback signal and a pulse in the down signal is generated whenever the outer feedback signal is in a particular state (e.g., logic high) for longer than a predetermined duration (e.g., X microseconds).

In the example shown in FIG. 8, the outer feedback is in a high logic state for a first duration between times $t_1$ and $t_2$ and for a second duration between times $t_3$ and $t_4$. The first duration is less than the predetermined duration and no pulse occurs in the down signal to decrease the desired peak current level. The second duration is greater than the predetermined duration and a pulse occurs in the down signal to decrease the desired peak current level as seen in the coil current waveform. In the embodiment shown in FIG. 7, the timer circuit 702 determines whether the outer feedback signal has met the condition of being in a particular state for a specified duration and generates the down signal accordingly. During steady state operation, the scheme implemented by FIG. 7 adjusts the desired peak current level such that the duration that the outer feedback signal is in the logic high state is approximately equal to the predetermined duration set by the timer circuit 702. Thus, the timer circuit 702 can be used to control the duration of inactive periods of the modulator.

Figure 9:
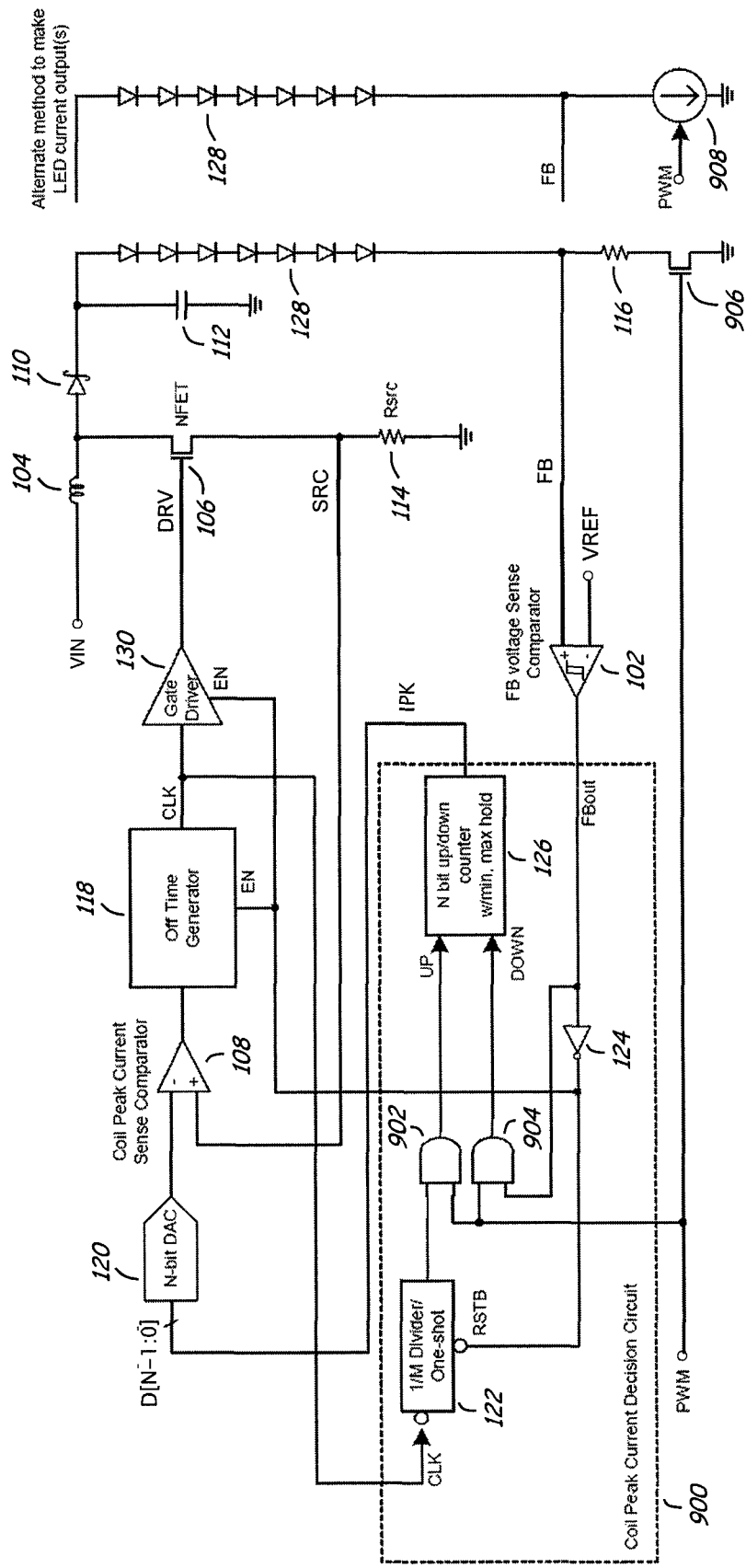
FIG. 9 is a circuit diagram for one embodiment of a boost converter that includes direct digital dimming.

FIG. 9 is a circuit diagram for one embodiment of a boost converter that includes direct digital dimming. Direct digital dimming is often used in a backlight system for a liquid crystal display (LCD) to control brightness or intensity of light sources for the backlight system. In the embodiment shown in FIG. 9, the light sources are white LEDs which are connected in series across an output of the boost converter. Although one string of LEDs is shown as the load 128 in FIG. 9, a LCD for a notebook computer or a computer monitor typically has multiple strings of LEDs driven in parallel by the boost converter to provide backlight.

In one implementation of direct digital dimming, a dimming control signal (PWM) is provided to the boost converter to periodically interrupt power to the load 128 using PWM techniques. For example, the dimming control signal is a substantially fixed frequency signal with varying pulse widths to determine a percentage of time that power is provided to the load 128. In the configurations shown in FIG. 9, the dimming control signal controls a switch 906 or a current source 908 coupled in series with the load 128. Thus, the load 128 can alternate between conducting a load current determined by an outer feedback loop of the boost converter and conducting no load current in response to the dimming control signal. That is, the controller for the boost converter repeatedly sees sudden changes (e.g., between 0% and 100%) in the load condition as the dimming control signal alternates between active and inactive states.

By way of example, the controller in FIG. 9 is similar to the controller shown in FIG. 1 with additional logic gates in a desired peak current circuit 900 to accommodate direct digital dimming. Direct digital dimming or other dimming methods can be implemented in any of the boost converters disclosed herein. The desired peak current circuit 900 in FIG. 9 includes a first AND-gate 902 inserted between an output of the clock divider 122 and an input of the binary counter 126 that receives the up signal. A second AND-gate 904 is inserted between the outer feedback signal generated by the feedback comparator 102 and an input of the binary counter 126 that receives the down signal. The dimming control signal is provided to inputs of both of the AND-gates 902, 904. Thus, the up signal and the down signal used to adjust a desired peak current level is gated by the dimming control signal. That is, the desired peak current level can only be adjusted when the dimming control signal is active and power is not prohibited from flowing to the load 128 for dimming effects.

Since the desired peak current level is not adjusted (or suspended) when the dimming control signal is inactive, the controller can advantageously respond quickly to avoid droops in the output voltage when the dimming control signal transitions from the inactive state back to the active state. For example, the desired peak current level generated by the desired peak current circuit 900 can maintain its value for a long time so the dimming control signal can have relatively long inactive states to implement a wide dimming range.

Figure 10:
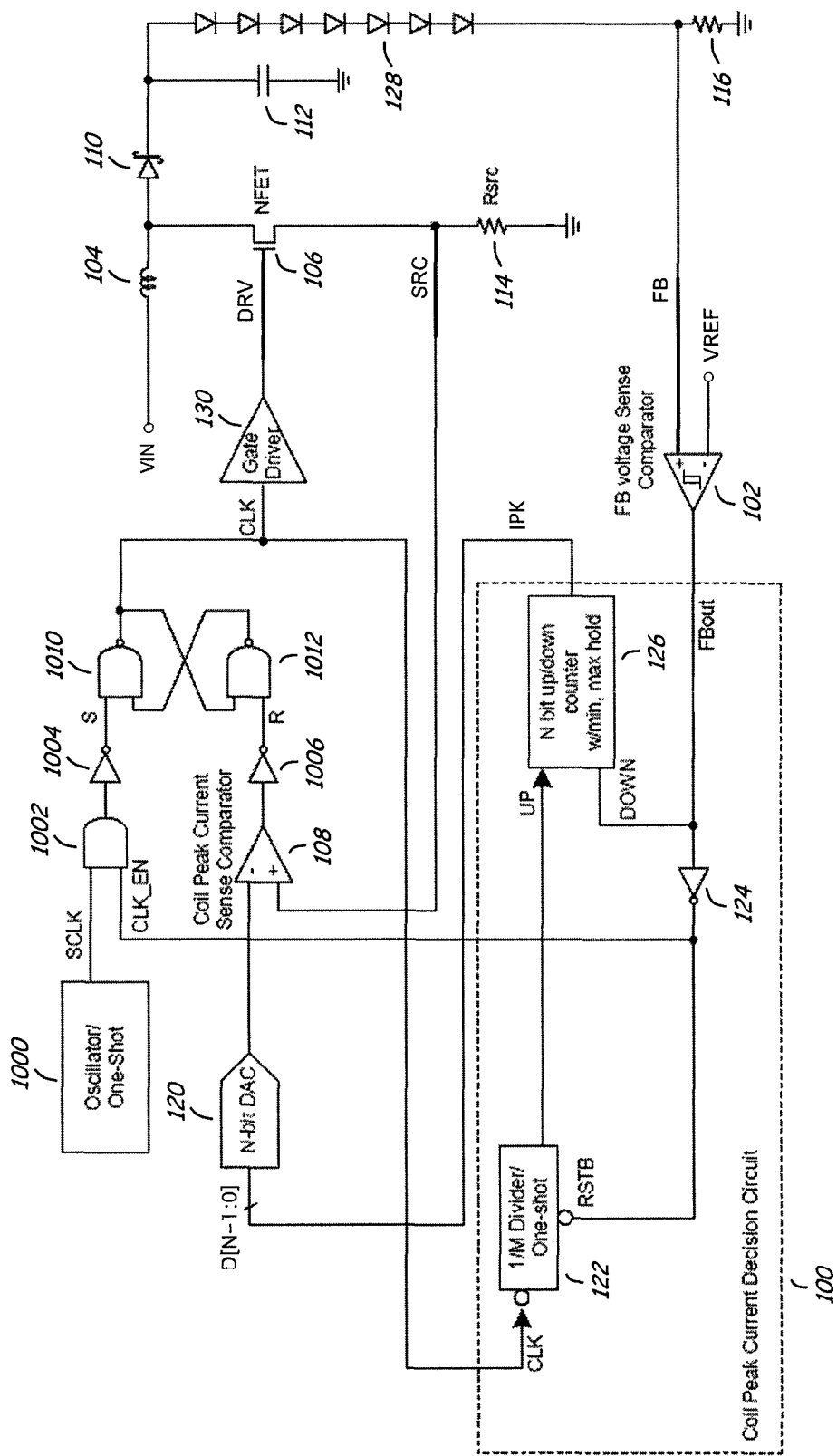
FIG. 10 is a circuit diagram for one embodiment of a boost converter that uses an oscillator to generate a driving signal with a substantially constant frequency.

FIG. 10 is a simplified circuit diagram for one embodiment of a boost converter that uses an oscillator circuit to generate a driving signal with a substantially constant frequency to drive a switch 106. By way of example, the boost converter shown in FIG. 10 is substantially similar to the boost converter shown in FIG. 1 except a feedback comparator 102 includes hysteresis and the oscillator circuit replaces the off-time generator 118. The oscillator circuit can replace the off-time generator 118 in any of the boost converters disclosed herein for fixed frequency switching.

In the embodiment shown in FIG. 10, the oscillator circuit includes an oscillator 1000 that outputs a timing waveform (SCLK), an AND-gate 1002, a first logic inverter 1004, a second logic inverter 1006 and a SR latch comprising a first NAND-gate 1010 and a second NAND-gate 1012. The timing waveform generated by the oscillator 1000 has a substantially fixed frequency and is provided to a first input of the AND-gate 1002. A second input of the AND-gate 1002 is coupled to an enable signal (CLK_EN) generated from an outer feedback signal (FBout). The enable signal intermittently blocks the timing waveform from the rest of the oscillator circuit, thereby intermittently disabling an output of the oscillator circuit and causing a controller comprising the oscillator circuit to operate in a discontinuous switching mode.

An output of the AND-gate 1002 is provided to a first input (S) of the SR latch after being inverted by the first logic inverter 1004. An output from a peak current comparator 108 is provided to a second input (R) of the SR latch after being inverted by the second logic inverter 1006. A clock signal (CLK) provided to a driver circuit 130 and a desired peak current circuit 100 is generated by an output of the SR latch (e.g., at an output of the first NAND-gate 1010).

Figure 11:
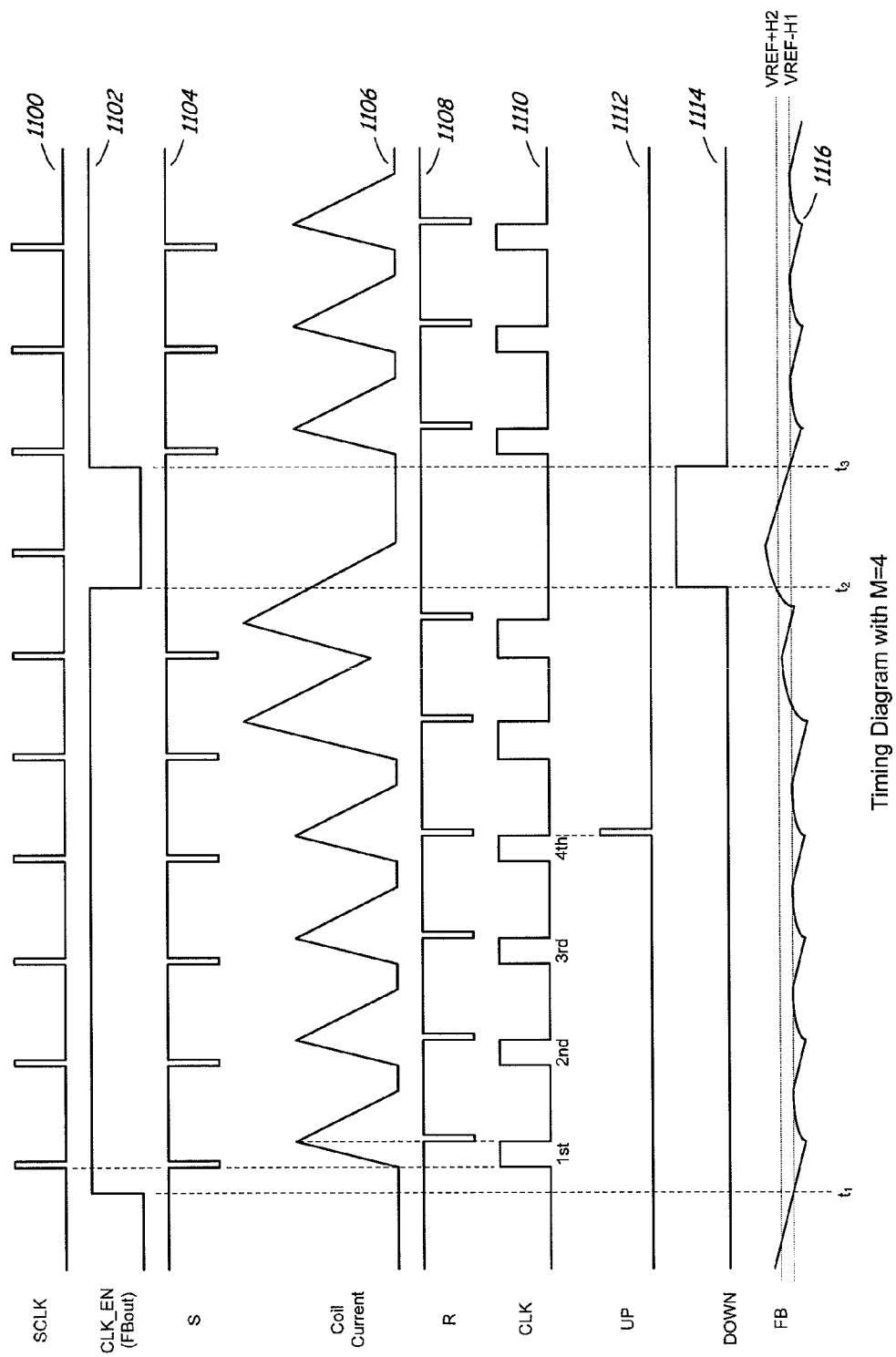
FIG. 11 illustrates select waveforms as a function of time in the boost converter shown in FIG. 10.

FIG. 11 illustrates select waveforms as a function of time in the boost converter shown in FIG. 10 to explain operation of the boost converter comprising the oscillator circuit in further detail. A graph 1100 shows the timing waveform (SCLK) generated by the oscillator 1000 as a function of time. A graph 1102 shows the enable signal (CLK_EN) generated based on the outer feedback signal as a function of time. A graph 1104 shows a set signal (S) as a function of time at the first input of the SR latch while a graph 1108 shows a reset signal (R) as a function of time at the second input of the SR latch. A graph 1106 shows a coil current conducted by an input inductor 104 as a function of time. A graph 1110 shows the clock signal (CLK) at the output of the SR latch as a function of time. A graph 1112 shows an up signal (UP) generated in the desired peak current circuit 100 as a function of time. A graph 1114 shows a down signal (DOWN) generated in the desired peak current circuit 100 as a function of time. Finally, a graph 1116 shows a sensed voltage (FB) generated across a second sense resistor 116 to indicate a load condition as a function of time.

By way of example, the timing waveform shown in the graph 1100 comprises periodic one-shot pulses for establishing a substantially fixed switching frequency. During an active duration of the enable signal (e.g., between times $t_1$ and $t_2$), a modulator comprising the oscillator circuit is enabled and an inverted version of the timing waveform (i.e., the set signal) is provided to the first input of the SR latch to determine a rising edge of the clock signal. As discussed in prior figures, the peak current detector 108 generates an output in accordance with a desired peak current level. An inverted version of the output from the peak current detector 108 (i.e., the reset signal) is provided to the second input of the SR latch to determine a falling edge of the clock signal. Thus, the clock signal has a frequency determined by the timing waveform and a pulse width (or duty cycle) determined by the desired peak current level.

When the modulator is enabled, the clock signal has a substantially fixed frequency determined by the oscillator 1000 and variable on/off times that depend on the desired peak current level. The clock signal is used to generate the driving signal for the switch 106. In the example waveforms shown in FIG. 11, the first four cycles of the clock signal have relatively narrow pulse widths such that the driving signal turns on the switch 106 for a relatively short duration in each cycle to conduct a coil current having a relatively low peak current in accordance with a first desired peak current level. The desired peak current level increases from the first desired peak current level to a second desired peak current level in response to a pulse in the up signal after the fourth cycle. Thus, the fifth and sixth cycles of the clock signal have longer pulse widths, and the driving signal turns on the switch 106 for longer durations in the fifth and sixth cycles to conduct a coil current having a higher peak current in accordance with the second desired peak current level.

When the enable signal is inactive (e.g., between times $t_2$ and $t_3$), the modulator is disabled and the clock signal becomes inactive to prevent conduction by the switch 106. In the example boost converter shown in FIG. 10, a pulse in the down signal decreases the desired peak current level when the enable signal becomes inactive. Thus, subsequent cycles of the clock signal have narrower pulse widths. The state (or condition) of the enable signal is determined in accordance with the sensed signal. As described above, the example boost converter in FIG. 10 uses a hysteretic feedback comparator 102. Thus, the enable signal becomes active when the sensed signal is less than a target reference by a first hysteretic amount (e.g., VREF−H1) and becomes inactive when the sensed signal is greater than the target reference by a second hysteretic amount (e.g., VREF+H2).

Figure 12:
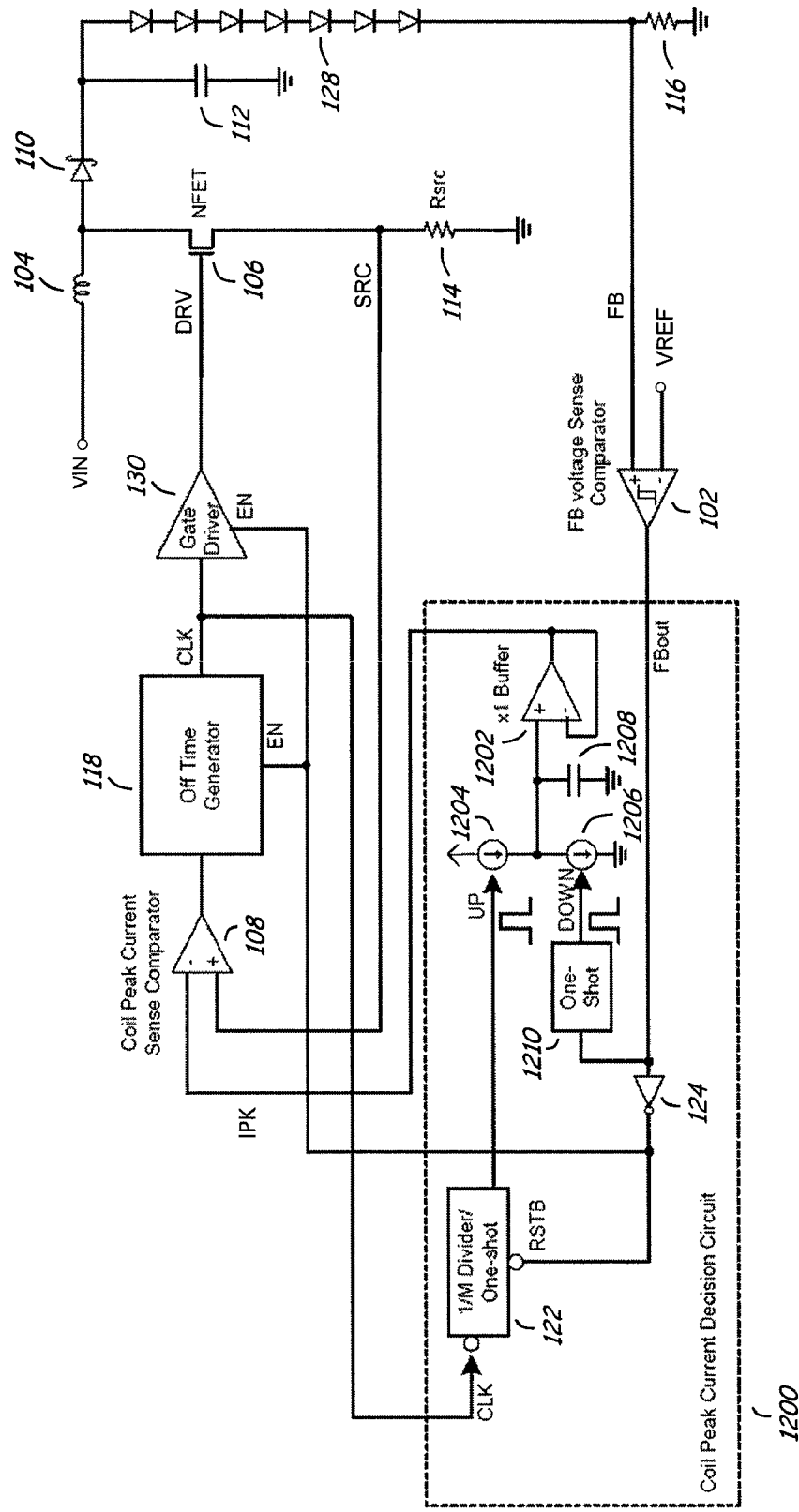
FIG. 12 is a circuit diagram for one embodiment of a boost converter that uses analog circuits to generate a desired peak current level.

FIG. 12 is a simplified circuit diagram for one embodiment of a boost converter that uses analog circuits to generate a desired peak current level in a continuous-time (i.e., analog) domain. By way of example, the boost converter in FIG. 12 is substantially similar to the boost converter shown in FIG. 1 except a desired peak current circuit 1200 shown in FIG. 12 uses analog circuits in addition to digital logic circuits and the N-bit DAC 120 is not needed in the embodiment shown in FIG. 12 to interface an output of the desired peak current circuit 1200 to a peak current comparator 108. The desired peak current circuit 1200 in FIG. 12 functions in a similar manner as the desired peak current circuit 100 in FIG. 1 to vary the desired peak current level (IPK) in discrete steps in response to the clock signal (CLK) and the outer feedback signal (FBout). In one implementation, the desired peak current circuit 1200 includes a buffer circuit 1202, a capacitor 1208, a clock divider 122, a one-shot generator 1210, a current source 1204 and a current sink 1206.

The clock divider 122 receives the clock signal that tracks a driving signal for a switch 106 in the boost converter. The clock divider 122 outputs a one-shot pulse after every M cycles of the clock signal. The current source 1204 charges the capacitor 1208 by a first predefined amount in response to the one-shot pulse from the clock divider 122. The one-shot generator 1210 receives the outer feedback signal and generates a one-shot pulse whenever the outer feedback signal changes from a first condition to a second condition (e.g., transitions from logic low to logic high). The clock divider 122 resets when the outer feedback signal is in the second condition. The current sink 1206 discharges the capacitor 1208 by a second predefined amount in response to the one-shot pulse from the one-shot generator 1210. The capacitor 1208 is coupled to an input of the buffer circuit 1202, and an output of the buffer circuit 1202 indicates the desired peak current level.

Figure 13:
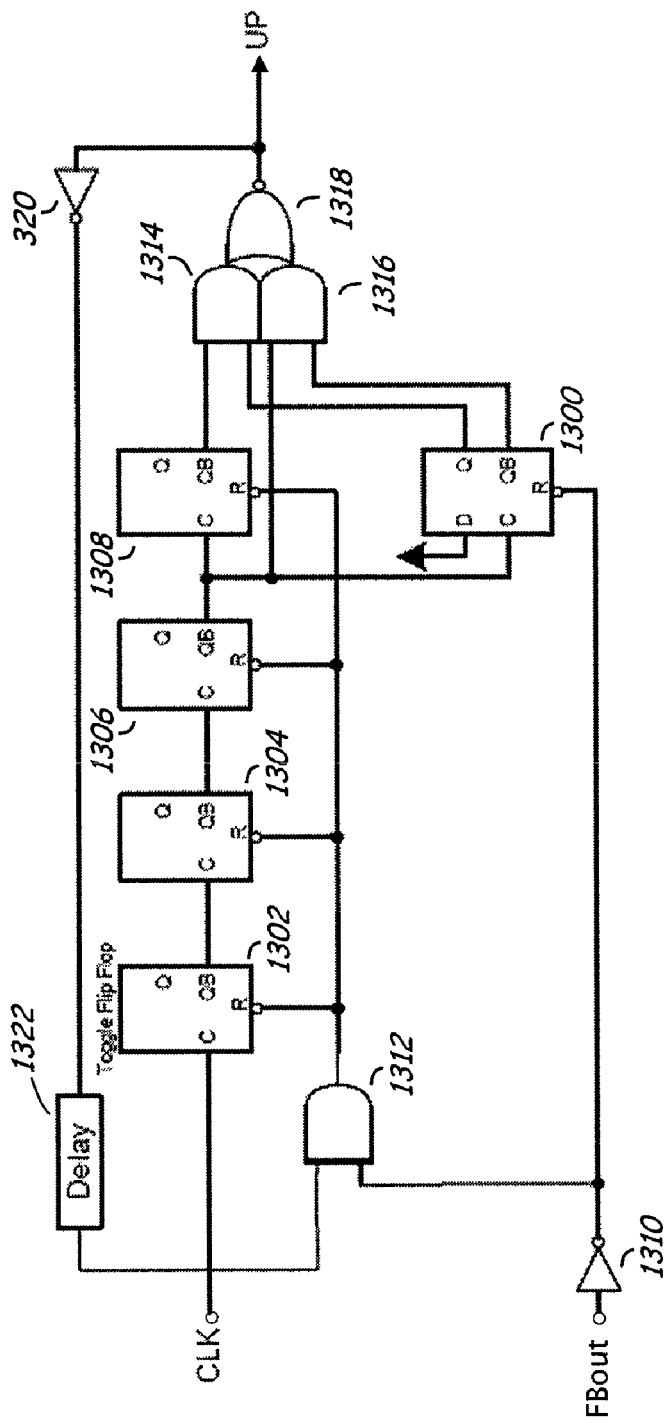
FIG. 13 illustrates one embodiment of a clock counter circuit.

FIG. 13 illustrates one embodiment of a clock counter circuit. The clock counter circuit can replace the clock divider 122 in the various embodiments of desired peak current circuits disclosed herein. Similar to the clock divider 122, the clock counter circuit receives a clock signal (CLK) and outputs a one-shot pulse after a predetermined number of cycles in the clock signal. The output of the clock counter circuit can be used to generate an up signal for increasing a desired peak current level.

An example of the clock counter circuit is shown in FIG. 13. The example clock counter circuit generates a one-shot pulse at a fourth switching cycle after a switching burst (or an active period of a modulator) begins and at every eighth switching cycle thereafter. Other configurations to implement more complex algorithms for generating a one-shot pulse are possible. The clock counter circuit in FIG. 13 includes four toggle flip-flop (TFF) circuits 1302, 1304, 1306, 1308 connected in a cascaded (or serial) configuration. The clock signal is provided to an input of the first TFF circuit 1302 in the cascaded configuration. An output of the last TFF circuit 1308 in the cascaded configuration is used to generate the up signal.

Similar to the clock divider 122, the clock counter circuit receives the outer feedback signal (FBout) for resetting functions. In the configuration shown in FIG. 13, the outer feedback signal is provided to reset inputs of the cascaded TFF circuits 1302, 1304, 1306, 1308 after being processed by logic gates (e.g., a logic inverter 1310 and an AND-gate 1312). In addition, the outer feedback signal is coupled to a reset input of a separate TFF circuit 1300. Outputs of the separate TFF circuit 1300 are processed in combination with the output of the last cascaded TFF circuit 1308 by logic gates 1314, 1316, 1318 to generate the up signal. In the embodiment shown in FIG. 13, the up signal is inverted and fed back to the AND-gate 1312 via a delay circuit 1322.

Figure 14:
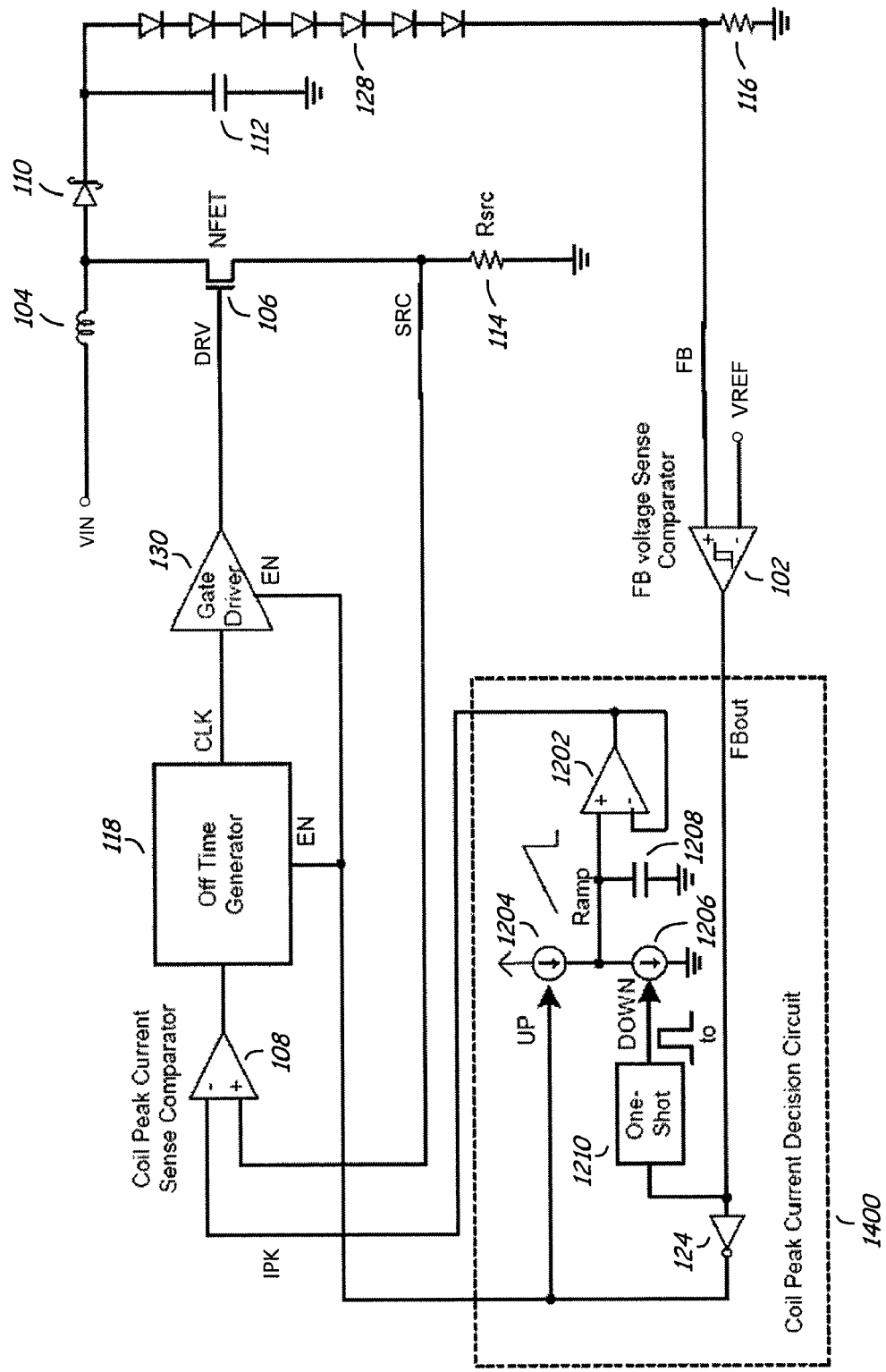
FIG. 14 is a circuit diagram for one embodiment of a boost converter that varies the desired peak current level linearly.

FIG. 14 is a circuit diagram for one embodiment of a boost converter that varies a desired peak current level linearly. By way of example, the boost converter shown in FIG. 14 is substantially similar to the boost converter shown in FIG. 12, except a desired peak current circuit 1400 in FIG. 14 does not use a clock signal to vary the desired peak current level. Similar to the desired peak current circuit 1200 shown in FIG. 12, the desired peak current circuit 1400 includes a buffer circuit 1202, a capacitor 1208, a one-shot generator 1210, a current source 1204 and a current sink 1206 connected in a similar configuration.

However, the desired peak current circuit 1400 does not use the clock divider 122 to generate an up signal for controlling the current source 1204. Instead, the current source 1204 is controlled by an inverted version of an outer feedback signal (FBout). Thus, the current source 1204 charges the capacitor 1208 when the outer feedback signal has a first condition (e.g., a logic low state that enables the modulator), and the current sink 1206 discharges the capacitor 1208 when the outer feedback signal transitions from the first condition to a second condition (e.g., a logic high state that disables the modulator). In other words, a voltage across the capacitor 1208 ramps linearly while the modulator is enabled and decreases by a predefined amount or to a predefined level when the modulator is disabled. The desired peak current level at the output of the buffer circuit 1202 is proportional to a voltage across the capacitor 1208.

Figure 15:
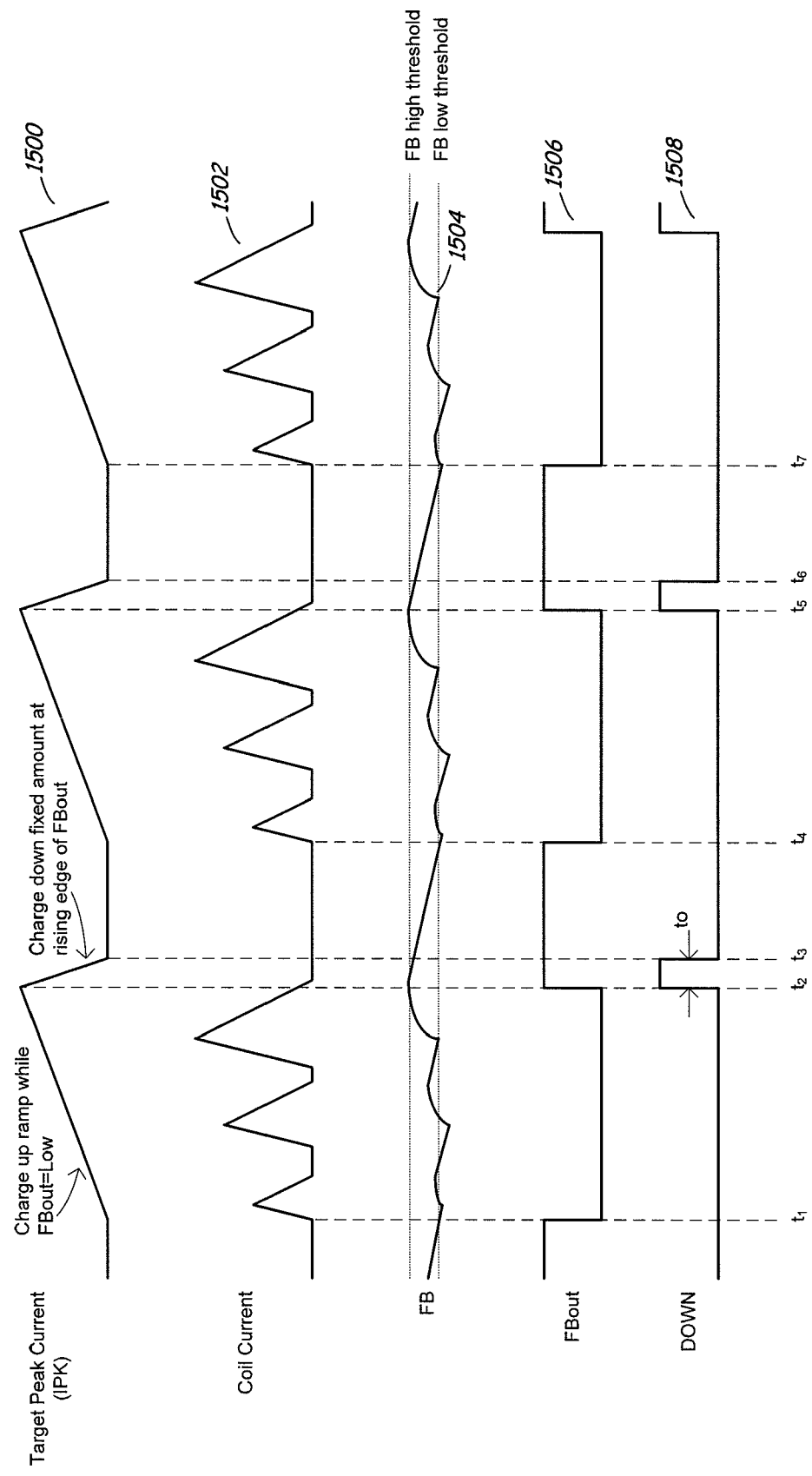
FIG. 15 illustrates select waveforms as a function of time in the boost converter shown in FIG. 14.

FIG. 15 illustrates select waveforms as a function of time in the boost converter shown in FIG. 14 to explain operation of the desired peak current circuit 1400 in further detail. A graph 1500 shows the desired peak current level (IPK or target peak current) as a function of time. A graph 1502 shows a coil current conducted by the input inductor 104 as a function of time. A graph 1504 shows a sensed voltage (FB) indicative of load conditions as a function of time. A graph 1506 shows the outer feedback signal (FBout) as a function of time. Finally, a graph 1508 shows the down signal that controls the current sink 1206 as a function of time.

In the example waveforms shown in FIG. 15, the desired peak current level increases linearly (or ramps) while the modulator is enabled (e.g., during times $t_1$-$t_2$ and $t_4$-$t_5$). The coil current reaches a higher peak level for each successive switching cycle while the desired peak current level ramps. The modulator is enabled when the sensed voltage is less than a low threshold (FB low threshold) and disabled when the sensed voltage is approximately equal to or greater than a high threshold (FB high threshold). When the modulator is disabled (e.g., at times $t_2$ and $t_5$), a one-shot pulse in the down signal discharges the capacitor 1208.

Various embodiments have been described above. Although described with reference to these specific embodiments, the descriptions are intended to be illustrative and are not intended to be limiting. Thus, various modifications and applications may occur to those skilled in the art without departing from the true spirit and scope of the invention as defined by the appended claims.

What is claimed is:

1. A controller for a DC-to-DC power converter, the controller comprising:
    a modulator configured to generate a driving signal for alternately turning on and off a switching transistor, wherein the switching transistor conducts a coil current that increases while the switching transistor is on and the driving signal turns off the switching transistor after the coil current reaches a desired peak current level;
    a feedback comparator configured to generate a feedback signal based on comparing a target reference with a sensed signal indicative of a load condition; and
    a desired peak current circuit configured to generate an output to indicate the desired peak current level and to vary the desired peak current level based at least in part on the feedback signal while the controller operates in a discontinuous switching mode in which the feedback signal transitions to a first state that enables the modulator when the sensed signal is less than the target reference and transitions to a second state that disables the modulator when the sensed signal is greater than the target reference,
    wherein the desired peak current circuit further varies the desired peak current level responsive to a clock signal that tracks the driving signal for the switching transistor, and
    wherein the desired peak current circuit comprises,
        a clock divider or a clock counter that receives the clock signal and outputs a one-shot pulse after every M cycles of the clock signal, and
        a binary counter that increases by a first predefined step in response to an up signal and decreases by a second predefined step in response to a down signal, wherein an output of the binary counter indicates the desired peak current level.

2. The controller of claim 1, wherein the desired peak current circuit varies the desired peak current level in discrete steps.

3. The controller of claim 1, wherein the down signal decreases the binary counter each time the feedback signal is in the second state for greater than a predetermined duration.

4. The controller of claim 1, wherein the modulator is a pulse frequency modulator comprising:
    a peak current comparator configured to compare a detected signal indicative of the coil current with the output from the desired peak current circuit indicative of the desired peak current level;
    an off-time generator configured to receive an output of the peak current comparator and to generate a clock signal with substantially fixed inactive durations; and
    a driver circuit configured to receive the clock signal and to generate the driving signal for the switching transistor.

5. The controller of claim 1, wherein the modulator comprises:
    an oscillator configured to generate a periodic signal with a predetermined frequency, wherein the periodic signal starts active durations of a clock signal at regular intervals;
    a peak current comparator configured to compare a detected signal indicative of the coil current with the output from the desired peak current circuit indicative of the desired peak current level, wherein each active duration of the clock signal stops when the coil current exceeds the desired peak current level; and
    a driver circuit configured to receive the clock signal and to generate the driving signal for the switching transistor.

6. A method for controlling a switch in a DC-to-DC power converter, the method comprising:
    comparing a sensed signal indicative of a load condition with a target reference to generate an outer feedback signal;
    varying a desired peak current level responsive to said generated outer feedback signal;
    comparing a sensed coil current with the desired peak current level to generate an inner feedback signal;
    generating, responsive to said generated inner feedback signal, a driving signal arranged to conduct a temporally increasing coil current through the switch when active and cease conduction through the switch when inactive;
    enabling, responsive to a first condition of said outer feedback signal, said driving signal to conduct the current through the switch;
    disabling, substantially over an entire designed load range and responsive to a second condition of said outer feedback signal, said driving signal from conducting the current through the switch; and
    additionally varying the desired peak current level responsive to a clock signal that tracks the driving signal, wherein said varying the desired peak current responsive to the clock signal level comprises:
   generating a digital word to indicate the desired peak current level; and
   increasing the digital word by a predetermined amount when the outer feedback signal does not transition from the first condition to the second condition within M cycles of the clock signal after a previous adjustment to the digital word.

7. The method of claim 6, wherein the varying of said desired peak current level is in discrete steps.

8. The method of claim 6, wherein the varying of said desired peak current level is suspended during inactive durations in which power is not provided to a load.

9. The method of claim 6, wherein said varying the desired peak current level further comprises decreasing the digital word by a predetermined amount when the outer feedback signal transitions from the first condition to the second condition.

10. The method of claim 6, wherein said varying the desired peak current level further comprises decreasing the digital word by a predetermined amount when the outer feedback signal transitions from the first condition to the second condition within L cycles of the clock signal.

11. The method of claim 6, wherein said varying the desired peak current level further comprises decreasing the digital word by a predetermined amount when the outer feedback signal is in the second condition for more than a predefined duration.

12. The method of claim 6, wherein the driving signal when enabled sets the switch to conduct the temporally increasing current at periodic intervals for substantially constant frequency operation.

13. The method of claim 6, wherein the driving signal when enabled has substantially fixed inactive durations for pulse frequency modulation operation.

14. A controller comprising:
   a means for generating a feedback signal that indicates whether a load condition is above a reference level or below the reference level;
   a means for generating a driving signal to alternately turn on and off a semiconductor switch, wherein the semiconductor switch turns on for a duration that varies with a desired peak current level; and
   a means for adjusting the desired peak current level based on the feedback signal while the controller operates in a discontinuous switching mode in which the driving signal is enabled and disabled responsive to different conditions of said feedback signal.

15. The controller of claim 14, wherein the desired peak current level is adjustable in discrete steps.

16. The controller of claim 14, wherein the desired peak current level is further adjustable based on the driving signal.

17. The controller of claim 16, further comprising a means for counting a number of switching cycles in the driving signal and increasing the desired peak current level when the number of switching cycles exceeds a predetermined amount since a previous adjustment to the desired peak current level.

18. The controller of claim 14, wherein the desired peak current level decreases when the feedback signal changes from a first condition to a second condition.

19. The controller of claim 14, wherein the desired peak current level increases when the feedback signal condition indicates that the load condition is below the reference level.

* * * * *